United States Patent
Inaguma et al.

(12) 
(10) Patent No.: US 6,172,857 B1
(45) Date of Patent: Jan. 9, 2001

(54) MAGNETORESISTIVE HEAD WITH AZIMUTH ANGLE AND MAGNETIC RECORDING/REPRODUCING TAPE APPARATUS USING SAME

(75) Inventors: Teruo Inaguma; Seiji Onoe; Hiroshi Kano, all of Miyagi; Yoshito Ikeda, Tochigi; Seiichi Onodera, Miyagi, all of (JP)

(73) Assignee: Sony Corporation, Tokyo (JP)

(*) Notice: Under 35 U.S.C. 154(b), the term of this patent shall be extended for 0 days.

(21) Appl. No.: 09/225,913

(22) Filed: Jan. 5, 1999

(30) Foreign Application Priority Data

Jan. 6, 1998 (JP) .................................................. 10-001138

(51) Int. Cl.⁷ ................................. G11B 5/52; G11B 5/39
(52) U.S. Cl. ........................................... 360/271; 360/313
(58) Field of Search ................................... 360/107–108, 360/113, 313, 271

(56) References Cited

U.S. PATENT DOCUMENTS 4,594,619 * 6/1986 Hijikigawa ........................... 360/113
5,513,051 * 4/1996 Lee ...................................... 360/107
5,648,886 * 7/1997 Kobayashi ........................... 360/113

\* cited by examiner

*Primary Examiner*—A. J. Heinz
(74) *Attorney, Agent, or Firm*—Sonnenschein, Nath & Rosenthal

(57) ABSTRACT

A magnetoresistive head includes a magnetoresistive element sandwiched between a pair of soft magnetic material-made shields to detect signal from a magnetic tape under a magnetoresistance effect, the magnetoresistive element having a magnetic sensor disposed obliquely, at a predetermined azimuth angle, to a direction perpendicular in which the magnetic tape is fed or moved; the magnetoresistive head being installed on a rotating drum to read signal on the magnetic tape by the helical scanning method.

A recording/reproducing apparatus includes a rotating drum having installed thereon the magnetoresistive head as reading head and an inductive magnetic head as writing head, to write and/or read signal from the magnetic tape by the helical scanning method.

7 Claims, 21 Drawing Sheets

MAGNETORESISTIVE HEAD WITH AZIMUTH ANGLE AND MAGNETIC RECORDING/REPRODUCING TAPE APPARATUS USING SAME

BACKGROUND OF THE INVENTION

1. Field of the Invention

The present invention relates to a magnetoresistive head mounted on a rotating drum and adapted to read a magnetic tape as recording medium by a helical scanning method, and to a magnetic recording/reproducing apparatus using the magnetoresistive head.

2. Description of Related Art

The well-known magnetic recording/reproducing apparatuses using a magnetic tape as recording medium include a video tape recorder, audio tape recorder, computer-oriented data storage system, etc. It has been required for the magnetic recording/reproducing apparatuses to have a larger storage capacity by increasing the higher recording density.

To meet such a demand for both the higher recording density and larger storage capacity, it has been proposed for the magnetic recording/reproducing apparatus to use a magnetoresistive or magnetic-reluctance head (will be referred to as "MR head" hereinunder), and has been under development for practical use.

The MR head uses a magnetic-reluctance or magnetoresistive element (will be referred to as "MR element" hereinunder) as magnetic sensor. It is higher in sensitivity than the magnetic heads of inductive type, and provides a high reproduction output. Therefore, use of the MR head as reading magnetic head is expectable to implement a higher recording density and larger storage capacity.

A fixed head system adapted to read and write a hard disc as a recording medium is typically known as a magnetic recording/reproducing apparatus using an MR head. In the fixed head system, an MR element as magnetic sensor is disposed at an angle of 9020 to the head moving direction, and a guard band having no magnetic transition zone is provided at either end of the recording track not to detect a magnetic flux from the neighboring tracks.

The guard band is considerably disadvantageous to attain a higher recording density and larger storage capacity of the MR head.

SUMMARY OF THE INVENTION

It is therefore an object of the present invention to provide an MR head capable of a rather higher recording density and larger storage capacity than the conventional magnetic recording/reproducing apparatuses, and a recording/reproducing apparatus using the MR head.

There have been implemented helical scanning systems provided with no guard band. However, there exists no helical scanning system using an MR head.

The present invention provides a helical scanning system using an MR head as reading head but no guard band and which can attain a high track recording density.

According to the present invention, there is provided an MR head including an MR element sandwiched between a pair of soft magnetic material-made shields to detect signal from a magnetic tape under a magnetoresistance effect, the MR element having a magnetic sensor disposed obliquely, at a predetermined azimuth angle, to a direction perpendicular in which the magnetic tape is fed or moved;

the magnetoresistive head being installed on a rotating drum to read signal on the magnetic tape by the helical scanning method.

According to the present invention, there is also provided a recording/reproducing apparatus comprising a rotating drum having installed thereon to write and/or read, by the helical scanning method, signal from a magnetic tape with a thin film of magnetic metal as magnetic layer:

a magnetoresistive head, as reading head, having a magnetoresistive element sandwiched between a pair of soft magnetic material-made shields to detect signal from the magnetic tape under a magnetoresistance effect, the magnetoresistive element having a magnetic sensor disposed obliquely, at a predetermined azimuth angle, to a direction perpendicular in which the magnetic tape is fed or moved; and an inductive magnetic head as writing head.

The MR element is sandwiched between a pair of shielded made of a soft magnetic material. By disposing the MR head of this shielded structure at a predetermined azimuth angle, recording and reproduction can be done without using any guard band. A helical scanning system in which this MR head is adopted can attain a considerably higher recording density and larger storage capacity than the conventional magnetic recording/reproducing system.

BRIEF DESCRIPTION OF THE DRAWINGS

These objects and other objects, features and advantages of the present intention will become more apparent from the following detailed description of the preferred embodiments of the present invention when taken in conjunction with the accompanying drawings, of which.

DETAILED DESCRIPTION OF THE PREFERRED EMBODIMENTS

Figure 1:
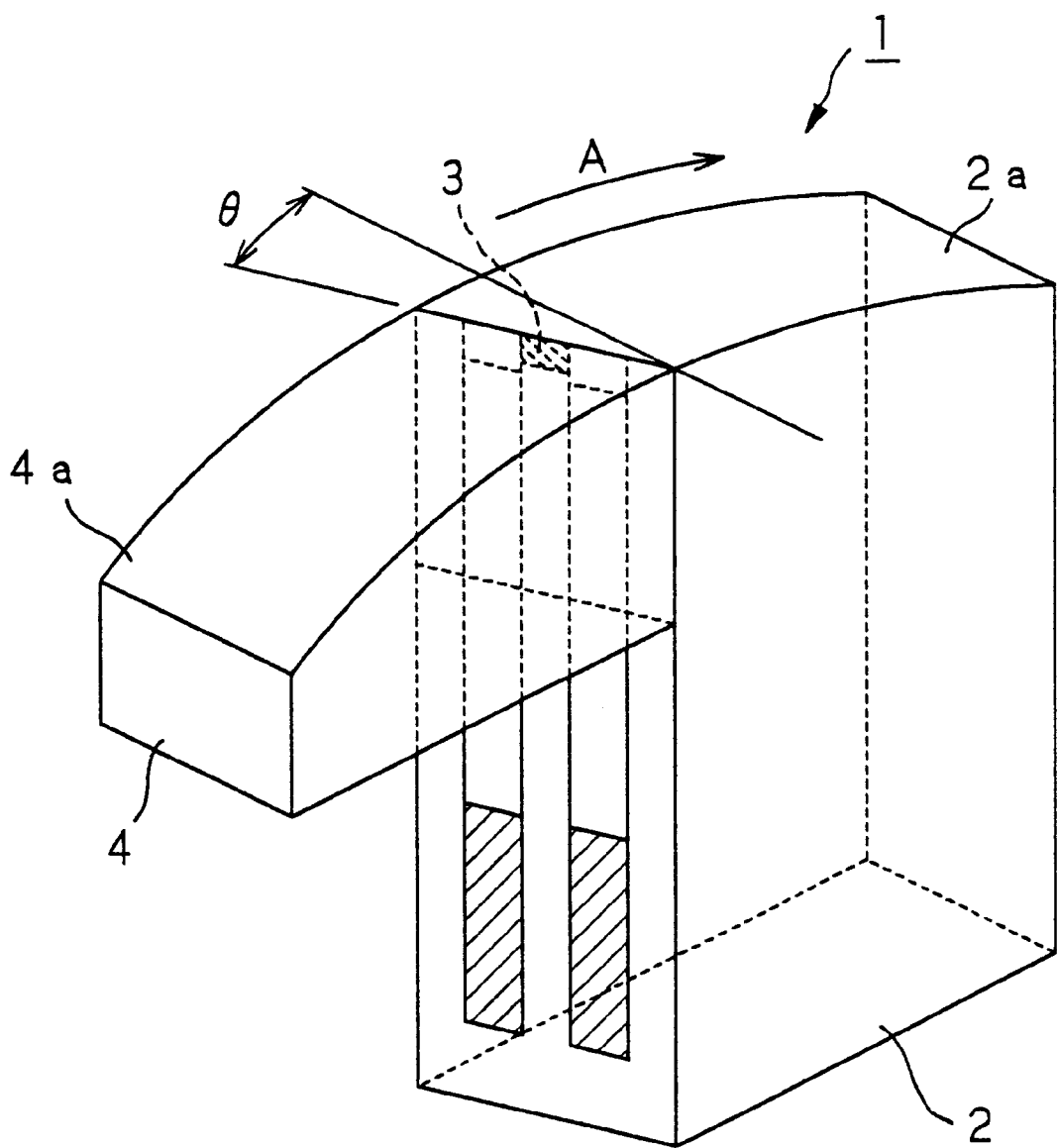
FIG. 1 is a schematic perspective view of an embodiment of the MR head according to the present invention.

Referring now to FIG. 1, there is illustrated a magnetic head according to the present invention. The magnetic head is generally indicated with a reference 1. It comprises a substrate 2, a magnetic head element 3 formed on the substrate 2 by a thin film forming process, and another substrate 4 joined on the magnetic head element 3. As will be seen from FIG. 2, the magnetic head 1 is installed on a rotating drum 5 and reads signal from a magnetic tape 6 by the helical scanning method.

As shown in FIG. 1, the magnetic head element 3 is disposed at an angle (so-called azimuth angle) with respect to a moving or feeding direction of the magnetic tape 6 in relation to the magnetic head 1, not perpendicularly to the tape feeding direction A.

The substrates 2 and 4 are formed as generally rectangular, thin plates, respectively, of which the top end faces serve as tape sliding surfaces 2a and 4a, respectively. The tape sliding surfaces 2a and 4a are shaped arcuate along the feeding or moving direction of the magnetic tape 6 so that the magnetic tape 6 can smoothly slid on them.

The magnetic head element 3 is an MR element which detects signal from the magnetic tape 6 under the magnetoresistive or magnetic reluctance effect.

Generally, the MR element is more suitable for recording with a high density than the inductive magnetic head element which utilizes the electromagnetic induction to read and write signal with respect to a magnetic tape. Therefore, by using an MR element as the magnetic head element 3, it is possible to attain a higher recording density.

Note that in Figures, the magnetic head element 3 is illustrated as enlarged in scale for easier understanding of its feature. Actually, however, the magnetic head element 3 is extremely smaller than the substrates 2 and 4. More particularly, for example, the length of the substrate 2 in the tape feeding direction is 0.8 mm while the portion of the substrate 2 where the magnetic head element 3 is formed is about 5 μm long in the tape feeding direction. Therefore, the magnetic tape 6 slides almost only the upper end faces 2a and 4a of the substrates 2 and 4 of the magnetic head 1, respectively.

In the magnetic head 1, the substrates 2 and 4 are made of a soft magnetic material such as Ni—Zn ferrite or Mn—Zn ferrite and serve to shield the magnetic head element 3. Thus, the magnetic head 1 has a shielded MR head structure in which the magnetic head element 3 is sandwiched between the shields (substrates 2 and 4).

It is important that the magnetic head (MR head) 1 has an azimuth angle which advantageously contributes to a magnetic recording/reproducing system with no guard band. The azimuth angle is also advantageous in many other respects.

In a high recording density-oriented magnetic recording/reproducing apparatus, use of the shielded MR reading head will result in a reduction of output due to the reduced tack width. Therefore, to establish the magnetic recording/reproducing apparatus of a high recording density, the output should be increased as much as possible and output noise component be suppressed as much as possible. The noises in an output are in three kinds: noise due to DC resistance of an magnetic head, noise due to an output amplifier, and noise due to a recording medium. They must be suppressed as much as possible.

Of these noises, the noise due to the magnetic head resistance will be described below. A voltage NV of a resistance noise due to a DC resistance R of magnetic head is expressed by a following formula (1):

$$NV = \sqrt{4kTR\Delta f} \qquad (1)$$

where k is Boltzmann constant, T is element temperature and Δf is unit frequency.

Therefore, the relative voltage NVr of the resistance noise can be expressed by a following formula (2). As seen, it is required to reduce the resistance of the MR head as much as possible.

$$NVr = 10\log\left(\frac{R}{R_0}\right) \qquad (2)$$

The conventional inductive type magnetic head can be designed for the DC resistance to be very low. Also when a coil is wound on a magnetic core 20 turns to provide a sufficient output voltage, the DC resistance can be less than 1Ω. Assume that the resistance is $R_{0\_}1\Omega$ and the resistance of the MR head including the resistance of the lead wire is R=30Ω. When these values are placed in the formula (2) for comparison of the noise voltage, NVr=14.8 dB and it will be seen that the resistance noise is high. When other noises than the resistance noise, such as the amplifier noise and medium noise are sufficiently low, the MR head provides an output per unit track width higher by 6 to 12 dB than a small helical scanning tape recording/reproducing system in which the magnetic head moves at a speed of 10 m/sec in relation to the magnetic tape, but the resistance noise will possibly cause the signal-to-noise (S/N) ratio to be lower. Taking in consideration the amplifier noise and medium noise in the currently available tape system, the resistance should be 30 Ω or less for a recording density of 1 Gbits/in$^2$ or more.

The resistance of the MR head can be reduced by increasing the thickness of lead wire, increasing the width of lead wire, reducing the resistance of the MR element, or otherwise. However, use of the shields limits the reduction in thickness of lead wire, the reduction of lead wire thickness adds to the manufacturing costs since a new equipment is required for that purpose, and the reduction range of the MR head resistance is limited depending upon the film status of MR element. However, the remaining method for reduction of the MR head resistance, namely, the increase of lead wire width to a maximum possible extent for reduction of the MR head resistance will not lead to any reduction of yield but allows the current high precision manufacturing process to be used as it is. This method should desirably be used for reduction of the MR head resistance.

In the shielded MR head, the resistance of the MR head including the resistance of the lead wires for connection to the MR element can be reduced by disposing the MR head so that the gap plane is oblique to the head moving direction (the azimuth angle is increased). If the track width is narrow, it is necessary to improve the absolute output. So, it is important to reduce the MR head resistance by increasing the azimuth angle to increase the width of lead wires as well as to increase the width of MR element to increase the output as well.

If the azimuth angle is increased excessively when increasing the azimuth angle by increasing the MR element, the MR element will have an increased resistance, so that the increase of the azimuth angle will be less effective in reduction of the MR head resistance.

Figure 3:
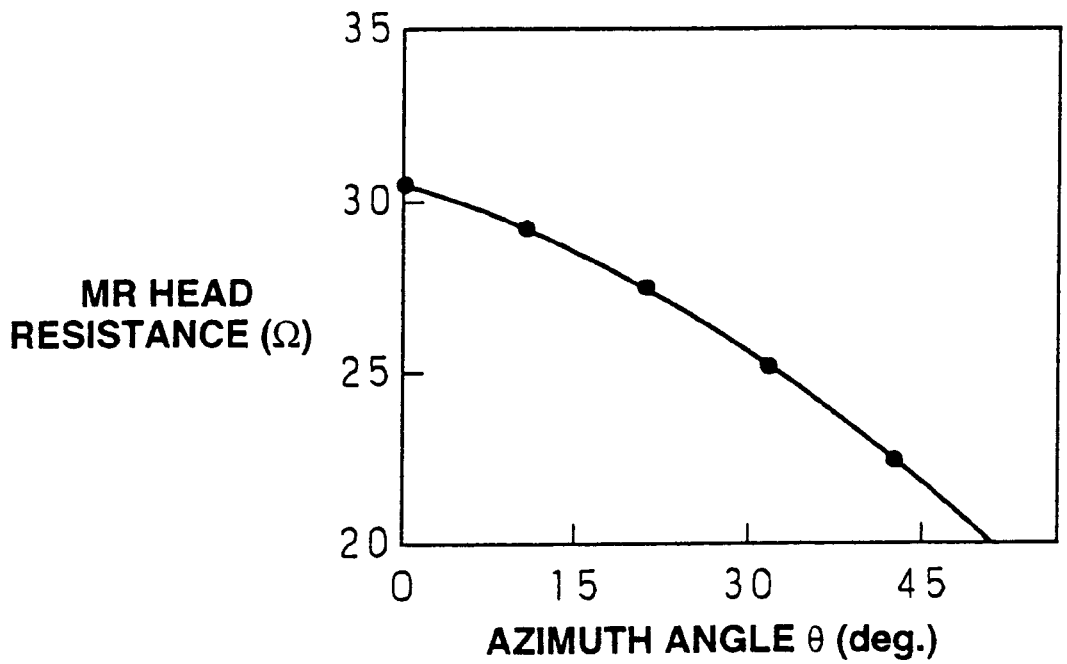
FIG. 3 is a characteristic curve showing the relationship between the azimuth angle and MR head resistance when the reading width is varied correspondingly to an azimuth angle.

For example, an actual MR head will be described in which the azimuth angle is θ=0°, MR element width is 5 μm, MR element is 1.5 μm higher from the sliding surface, MR element is 40 nm thickness, lead wire is 130 nm thick and lead wire is 900 μm long. The resistance of the MR head is measured with only the lead wire width changed correspondingly to a magnitude of the azimuth angle while the parameters of the MR element are left unchanged. The measurement results are graphically shown in FIG. 3. Therefore, an azimuth angle of 5° or less shows only a low effect of reducing the MR head resistance. With the azimuth angle increased more, the MR head resistance is reduced more, so that the resistance noise is reduced while a higher S/N ratio can be provided.

Figure 4:
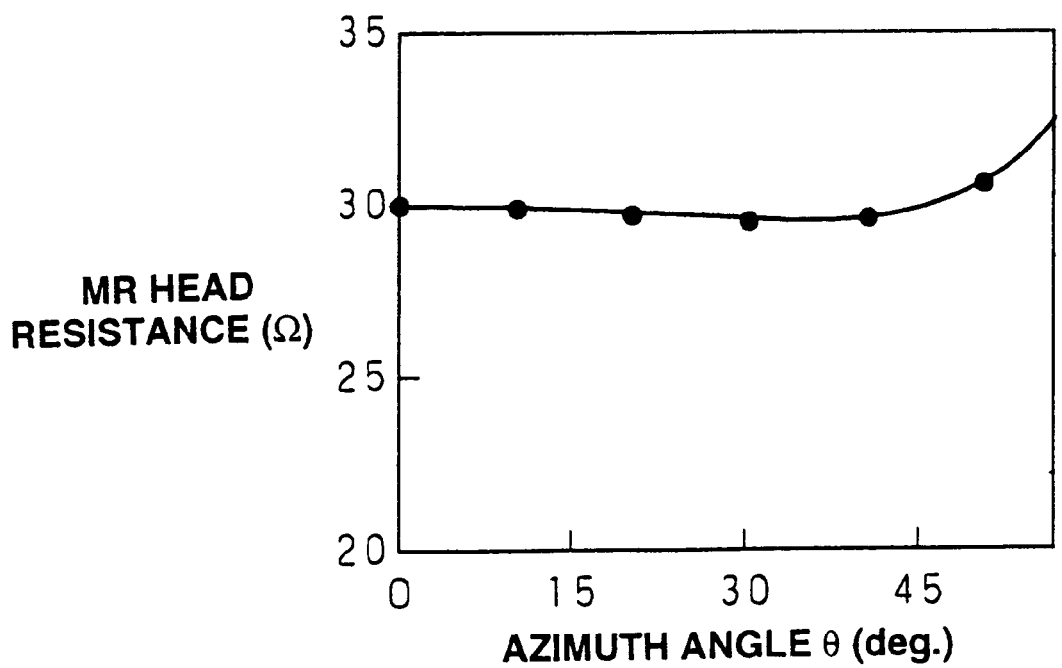
FIG. 4 is a characteristic curve showing the relationship between the azimuth angle and MR head resistance when the MR element width is varied correspondingly to an azimuth angle.
Figure 5:
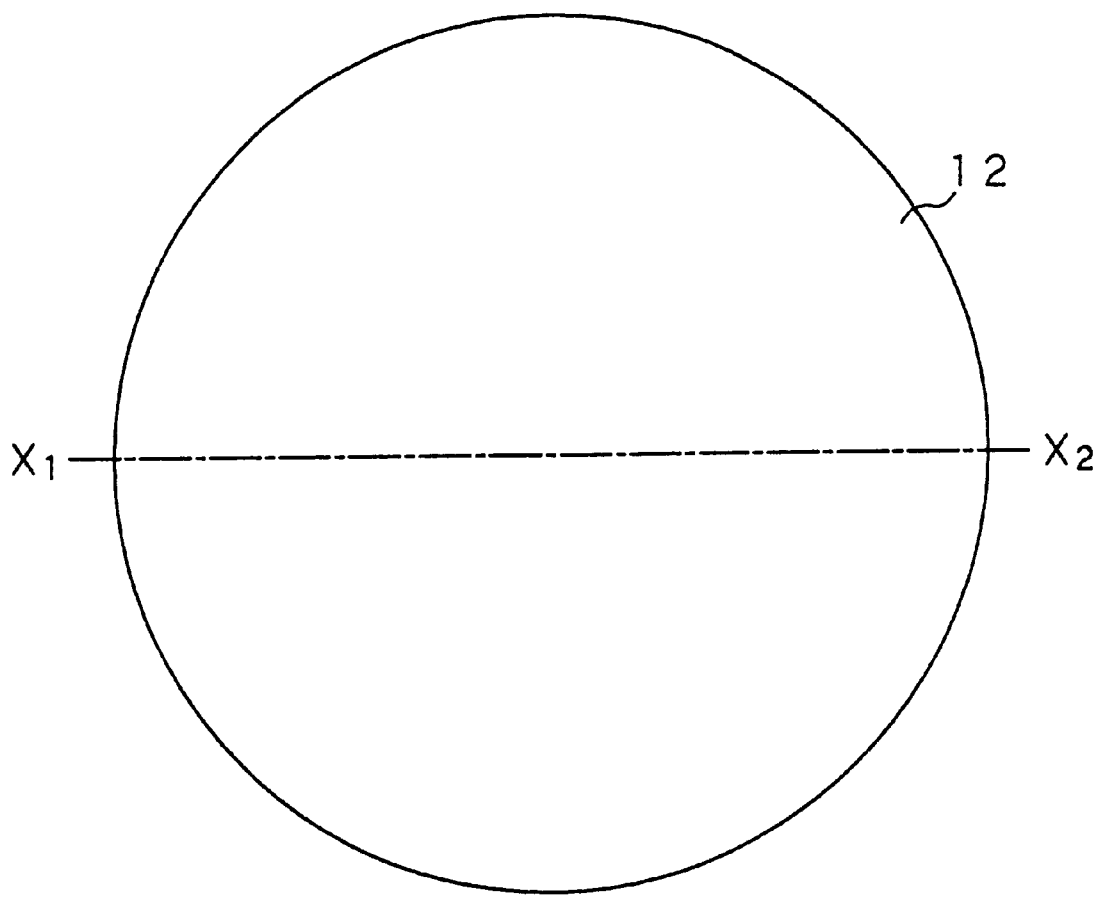
FIG. 5 is a schematic plan view of a substrate on which a nonmagnetic, nonconductive film is formed in the process of manufacturing the MR head.
Figure 6:
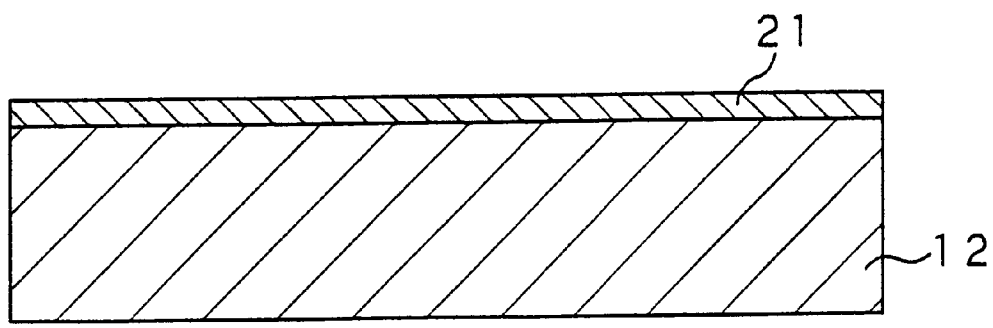
FIG. 6 is a schematic sectional view of the substrate on which the nonmagnetic, nonconductive film is formed.

To meet a requirement for a larger output, the MR element should be correspondingly wider. However, when the MR element width is increased, similarly to the lead wire thickness, correspondingly to a larger azimuth angle, the MR head resistance will be as graphically shown in FIG. 4. When the MR element width is fixed, the MR head resistance will also be reduced as the azimuth angle is increased.

As the MR element width is increased corresponding to a larger azimuth angle, however, the resistance of the MR element itself increases. The MR head resistance with an azimuth angle of 45° or more exceeds a one with the azimuth angle of 0°.

In consideration of the foregoing, the MR head 1 according to the present invention should desirably have an azimuth angle of 5° to 45°.

As in the above-mentioned example, when the MR element width is further reduced, the MR head output is reduced so that a further reduction of the MR head resistance is required and has an increased importance. The increase of lead wire width along with an increased azimuth angle is a key to solve the problem of MR head resistance without addition to the manufacturing costs.

The disposition of the MR element at an azimuth angle in the MR head is also very advantageous in an easier manufacture of the MR head.

For reproduction of a high-density recording pattern with a track width of 3 μm, for example, however, the gap has to be designed for a width which will not cause any cross talk from tracks having a same azimuth angle. Namely, the gap width cannot be more than 9 μm. It should be a maximum of 6 μm when the influence of the cross talk, track linearity and tracking servo performance are taken in consideration.

However, the reading magnetic heads adopted in the currently prevailing video tape recorders use a magnetic core (so-called bulk head) formed from MnZn ferrite, Sendust or similar which is inexpensive and can be worked easily through a simple process. For forming a bulk head having a gap width of 6 μm, the gap width must be determined in a machining following the gap formation, which will complicate the manufacturing process and thus lead to an increased manufacturing cost.

Also, concerning the laminated head and ETF head in which a magnetic core is formed only from a thin film of soft magnetic metal on a nonmagnetic substrate, it is possible to reduce the gap width by displacing the thin film of soft magnetic metal formed on the nonmagnetic substrate during the lamination and gap formation. However, a cross talk will influence the recording unless the accuracy of gap width is less than ±0.5 μm, for example. Thus these magnetic heads cannot be produced with a sufficient yield.

As having been mentioned above, the conventional magnetic heads cannot attain a desired azimuth angle as well as a required accuracy of gap width, and thus could not be manufactured without increase of the manufacturing costs when trying to implement a recording on a narrower track with such conventional magnetic heads.

For reproduction of a high-density recording pattern with a track width of 3 μm, for example, with an MR head, the length of the magnetic sensor of MR element corresponding to the gap width is designed as in the design of the inductive type magnetic head. However, the accuracy of the MR element formation is a minimum of ±0.5 μm or less. Further, the disposition of the MR element at an azimuth angle in the MR head allows the MR element width to be designed large. Thus it is easier to manufacture the magnetic sensor. More particularly, the magnetic sensor can have a width of 5 μm when an azimuth angle of 0°, and it can be as wide as 6.1 μm with an azimuth of 35°.

Thus, with an increased azimuth angle, the accuracy requirement for the magnetic sensor width is correspondingly eased. The narrower design of recording track results in little increase of the manufacturing costs. More particularly, for a magnetic head chip which should have a limited thickness as in a helical scanning tape-pass head, disposition of the MR element at an azimuth angle will allow the pattern width to be larger, which thus contributes to an easier manufacture of the magnetic head.

Next, how the aforementioned magnetic head 1 is manufactured according to the present invention will be discussed below. It should be noted that some Figures to which reference will be made in the following description are enlarged in scale as in FIG. 1 for better understanding of the features of the magnetic head 1. Namely, all the members are not shown at a same dimensional ratio as the actual one.

In the following description, various members of the magnetic head 1, their materials, sizes and thickness will be referred to in detail. However, it should be appreciated that the present invention is not limited only to them. For example, a so-called shielded SAL (Soft Adjacent Layer)-biased MR element already used in hard disc unit or similar will be referred to as an example in the following. Needless to say, however, the magnetic head according to the present invention is applicable for any other MR elements than the shielded SAL-biased MR element.

For production of the magnetic head 1, a disc-liked substrate 12 of 3 inches in diameter, for example, is prepared first. The substrate 12 is mirror-finished. A plurality of magnetic head elements 13 is formed on the mirror-finished substrate 12. Then the substrate 12 having the plurality of magnetic head elements formed thereon is finally cut into a plurality of magnetic heads 1.

The substrate 12 also serves to guard the leading side and shield the lower layer of the magnetic head element 13. It is made from a hard soft magnetic material. More particularly, the substrate 12 should preferably one formed from Ni—Zn ferrite or Mn—Zn ferrite, for example.

Figure 15:
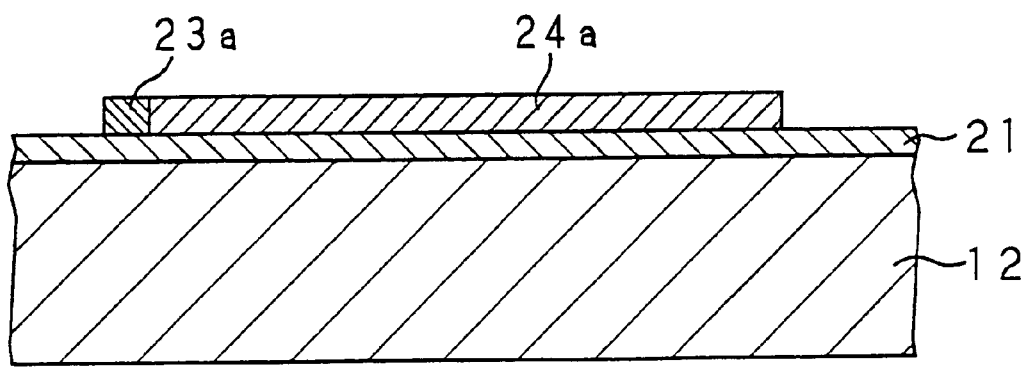
FIG. 15 is a schematic sectional view of the substrate, showing the process of patterning the conductive film.
Figure 16:
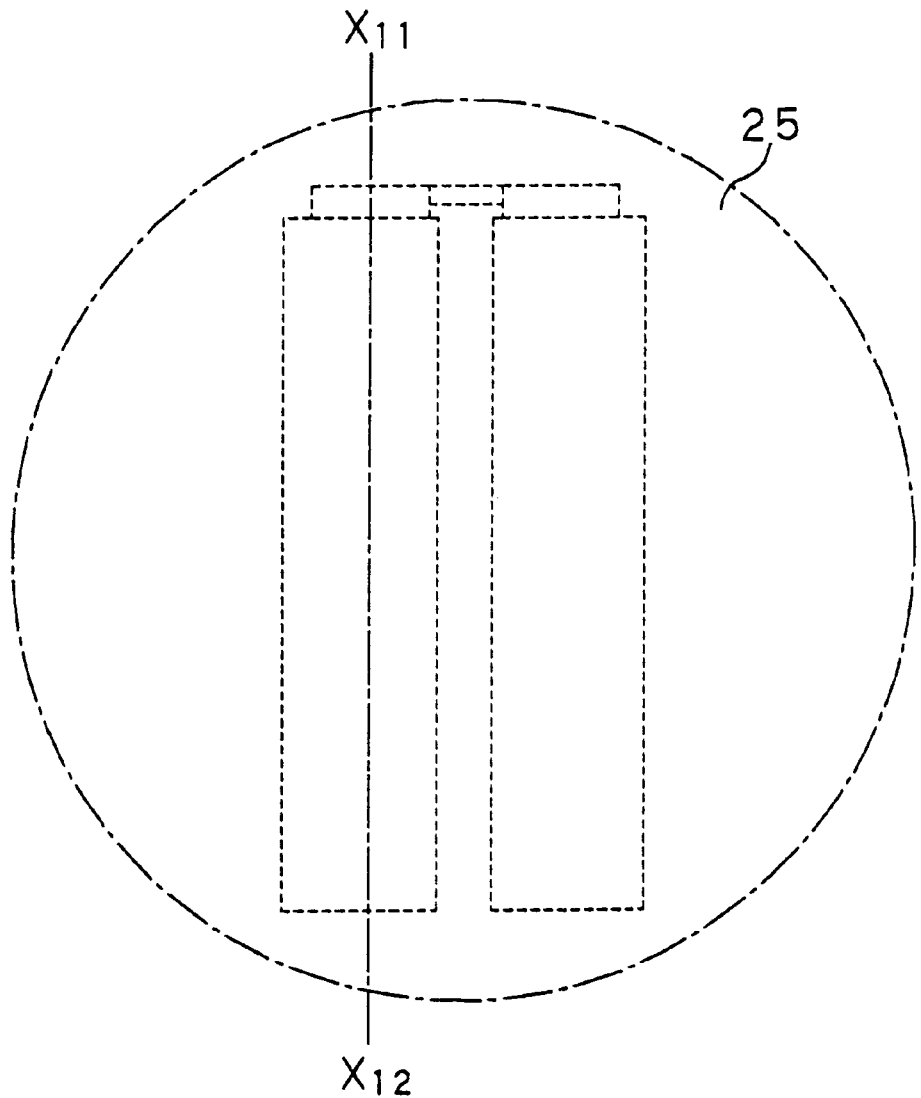
FIG. 16 is a schematic plan view of the substrate, showing the process of forming an upper-layer gap.

Next, a layer 21 of $Al_2O_3$ is formed on the substrate 12 to provide a low-layer gap of the magnetic head element 13 as shown in FIGS. 15 and 16. The $Al_2O_3$ layer is desirable for such use since the low layer of the magnetic head element 13 should be nonmagnetic and nonconductive. Note that the thickness of this nonmagnetic, nonconductive layer 21 may be set to have an appropriate value corresponding to a frequency, etc. of a to-be-recorded signal, and more particularly, 190 nm, for example.

Figure 7:
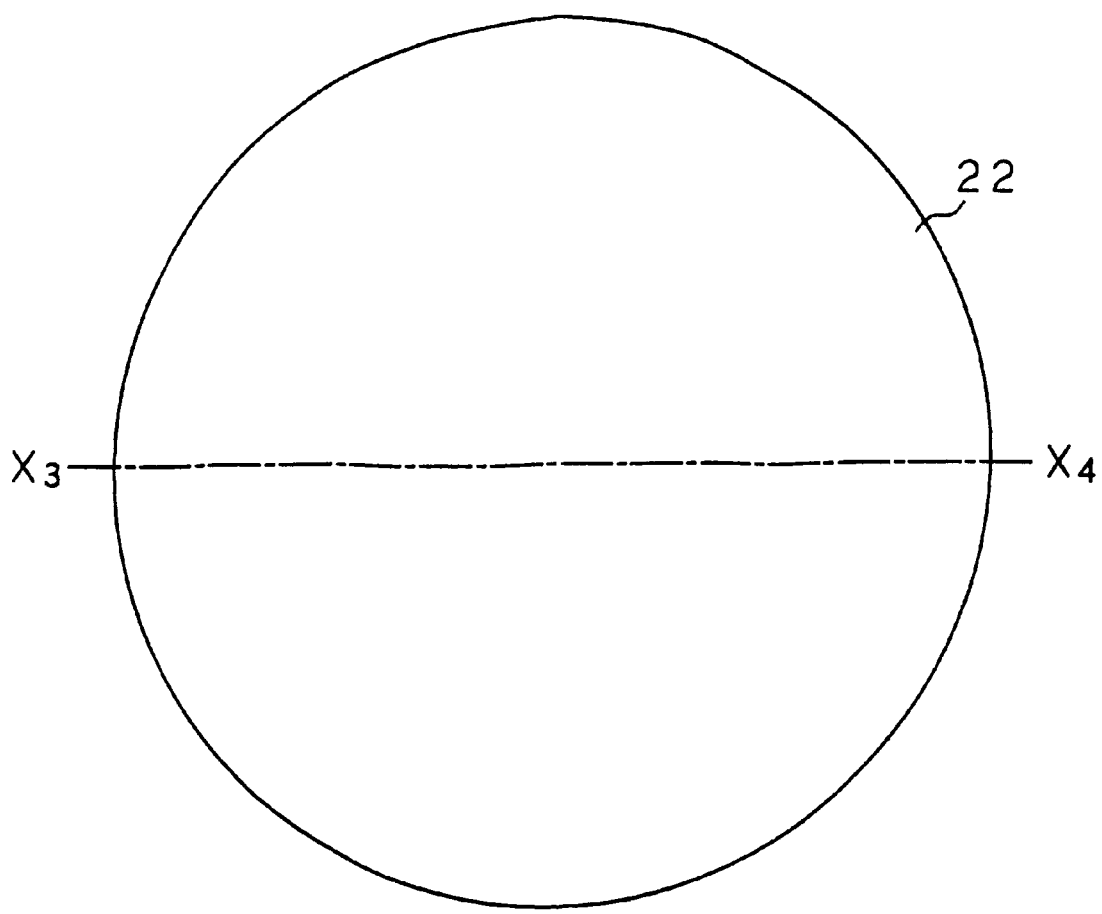
FIG. 7 is a schematic plan view of the substrate on which a thin film for MR element is formed.
Figure 8:
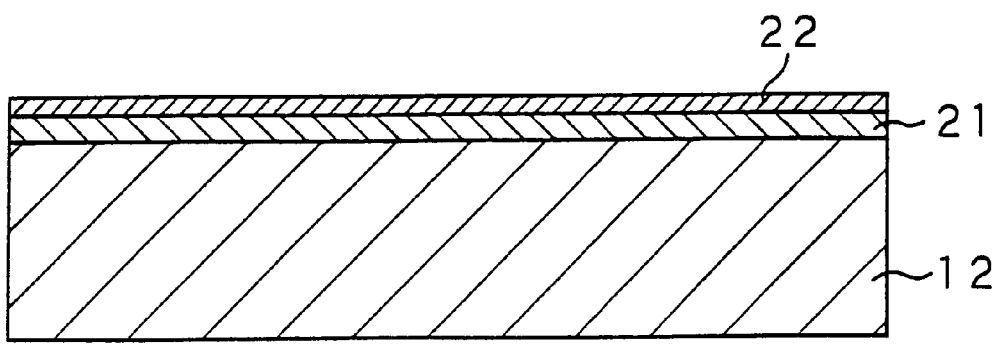
FIG. 8 is a schematic sectional view of the substrate on which the MR element thin film is formed.

Next, a thin film 22 which will form the SAL-biased MR element (will be referred to as "MR element thin film" hereinunder) is formed on the nonmagnetic, nonconductive layer 21 as shown in FIGS. 7 and 8. More particularly, there are formed on the MR element thin film 22 layers of Ta (of 5 nm in thickness), NiFeNb (of 43 nm), Ta (of 5 nm), NiFe (of 40 nm) and Ta (of 1 nm) in this order by sputtering. In this case, the NiFe layer is a soft magnetic film having a magnetoresistive or magnetic reluctance effect and provides the magnetic sensor of the magnetic head element 13. The NiFeNb layer is a soft magnetic layer (so-called SAL) which applies a bias magnetic field to the NiFe layer. Note that the materials and thickness of the MR element members are not limited only to the above-mentioned ones. Suitable materials and thickness may be used for the requirements for the magnetic recording/reproducing system in which the MR element is used.

Figure 9:
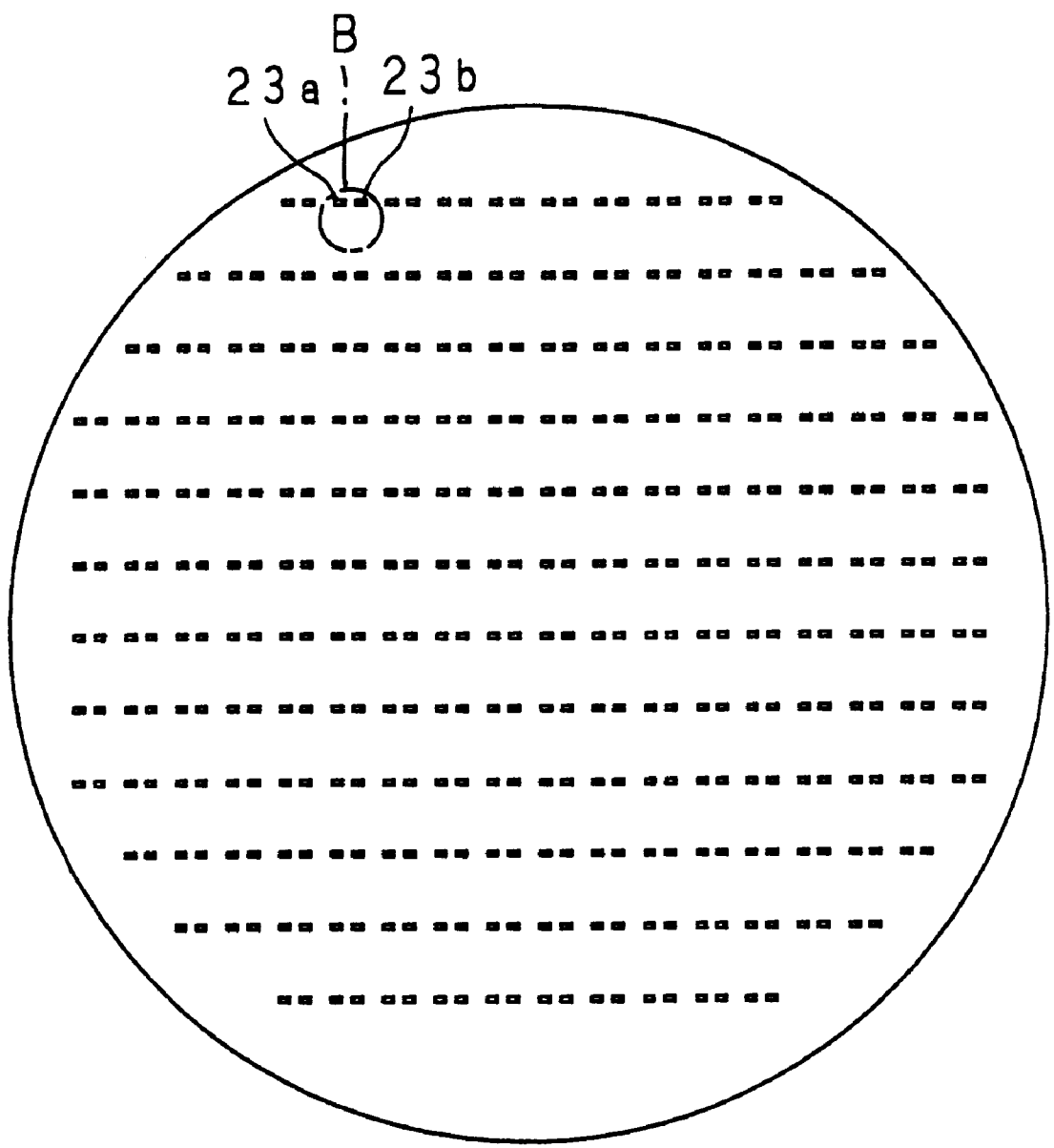
FIG. 9 is a schematic plan view of the substrate in which a permanent magnet film is embedded.
Figure 10:
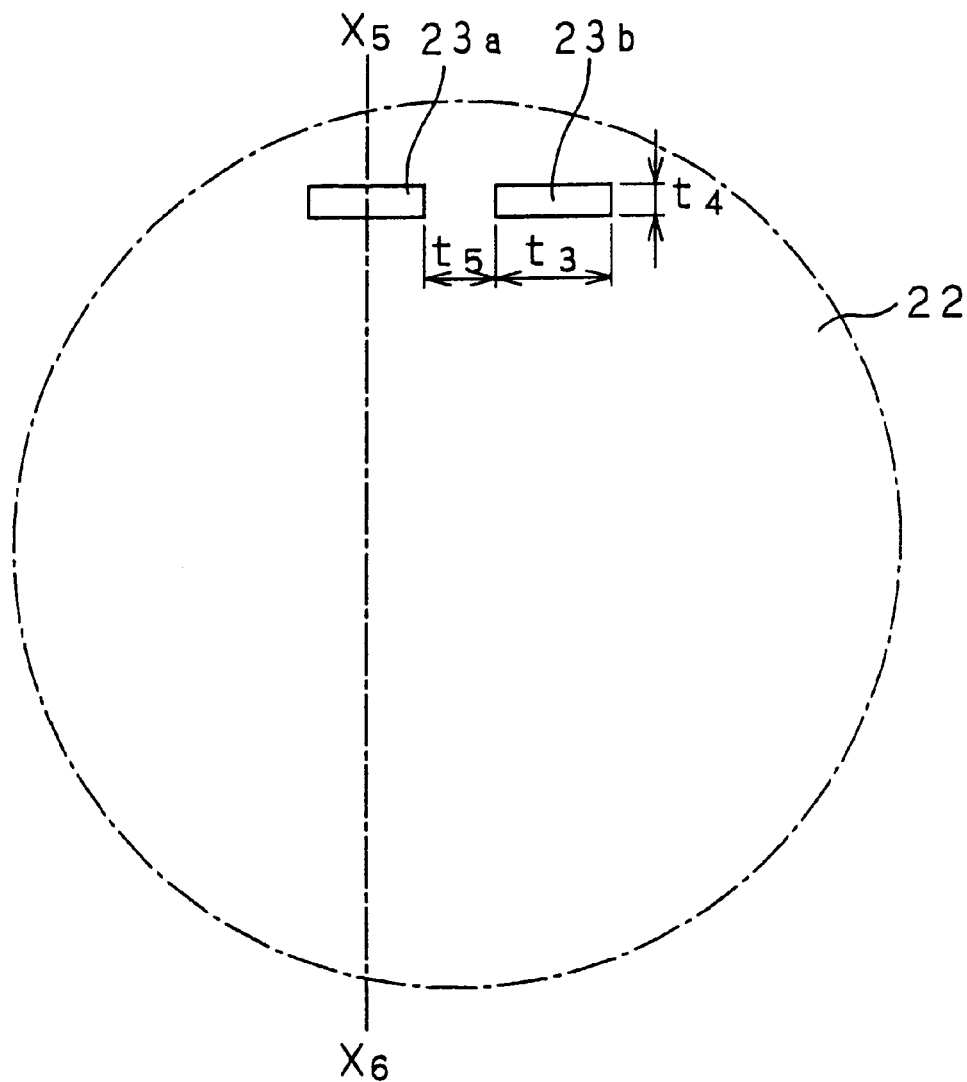
FIG. 10 is a schematic plan view of the substrate, showing the shape of the permanent magnet film embedded in the substrate.
Figure 11:
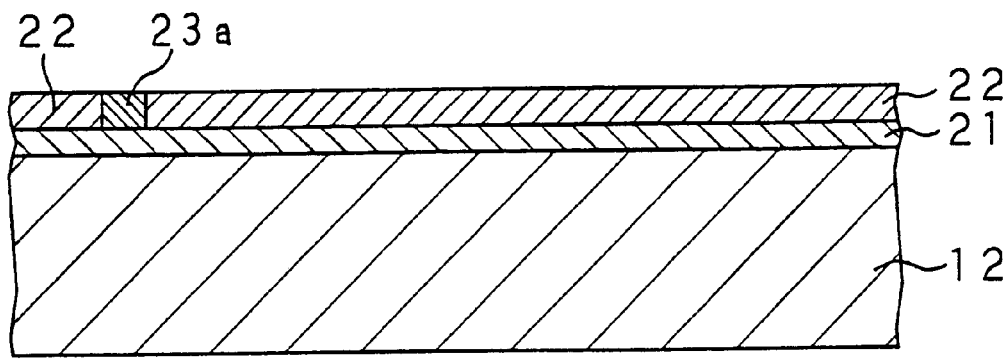
FIG. 11 is a schematic sectional view of the substrate in which the permanent magnet film is embedded.

Next, for stable operation of the MR element, the photolithography is used to embed two rectangular permanent magnet layers 23a dn 23b in the MR element thin film 22 of each magnetic head element as shown in FIGS. 9 through 11. It should be noted that a portion indicated with a reference B and as encircled in FIG. 9 and corresponding to the magnetic head element 13 is shown as enlarged in scale in FIGS. 10 and 11 and FIGS. 12 through 23 to which the present invention will be described with reference later. The permanent magnet layers 23a and 23b have a longitudinal length $t_3$ of about 50 μm and a lateral length $t_4$ of about 10 μm, for example. The two permanent magnet layers 23a and 23b are spaced from each other with a distance $t_5$ of about 5 μm, for example. The space $t_5$ between the two permanent magnet layers 23a and 23b will be the track width of the magnetic head element 13. Namely, the track width of the magnetic head element 13 is about 5 μm in this embodiment. According to the present invention, however, the track width is not limited to about 5 μm but it may be set appropriately depending upon the requirements for the magnetic recording/reproducing system in which the MR element is adopted. For embedding the permanent magnet layers 23a and 23b, a photoresist is used to first form a mask having two elongated openings for each magnetic head element, for example. Next, etching is effect to remove an MR element thin film 22 exposed in the opening. It will be appreciated that this etching may be done in either of dry and wet modes. However, ion etching is preferable in consideration of the easiness of processing and other factors.

Next, permanent magnet layers are formed by sputtering or otherwise. It will be appreciated that the permanent magnet layers 23 should desirably be formed from a material having a coercivity of 1,000 Oe or more, for example, CoNiPt or CoCrPt. Thereafter, the masking photoresist is removed along with the permanent magnet layers formed thereon. Thus, the permanent magnet layers 23a and 23b having a predetermined pattern will be embedded in the MR element thin film 22 as shown in FIGS. 9 to 11.

Figure 12:
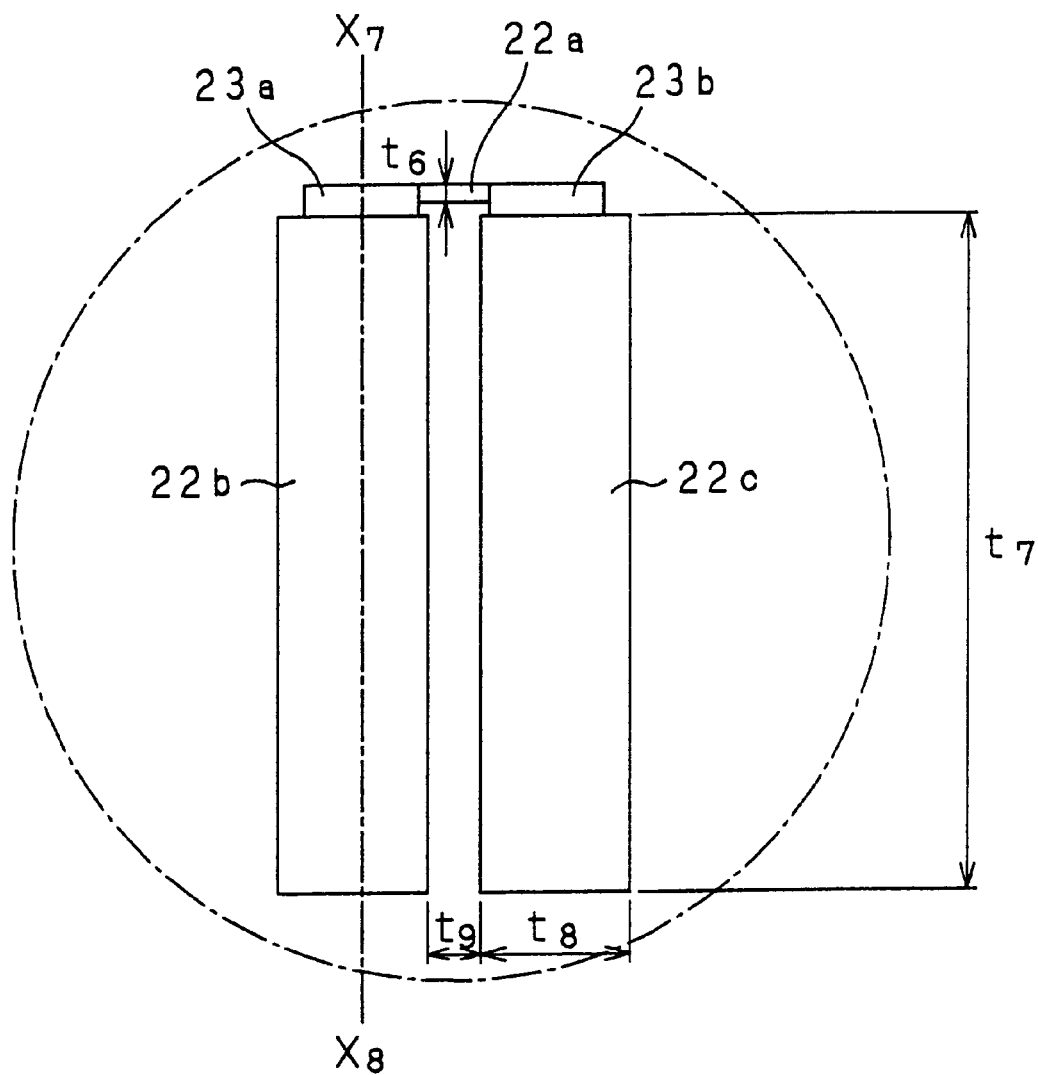
FIG. 12 is a schematic plan view of the substrate, showing the process of patterning the thin film for MR element.
Figure 13:
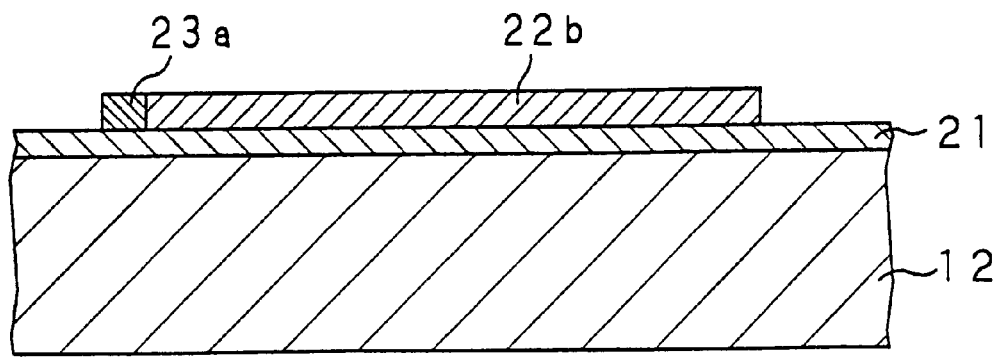
FIG. 13 is a schematic sectional view of the substrate, showing the process of pattering the thin film for MR element.

Next, the MR element thin film 22 is etched by photolithography with a portion 22a thereof, which finally will act as an MR element (will be referred to as "MR element 22a" hereinunder), left not etched away, as will be seen from FIGS. 12 and 13.

At this time, portions 22b and 22c of the thin film 22, which will be terminals to supply a sense current to the MR element 22a, are also left not etched. More particularly, a photoresist is used to first form a mask having openings for the MR element 22a and portions 22b and 22c of each magnetic head element. As mentioned above, the portions 22b and 22c will be the terminals which supply a sense current to the MT element 22a.

Next, etching is done to remove the MR element thin film 22 exposed in the opening. It will be appreciated that this etching may be done in either of dry and wet modes. However, ion etching is preferable in consideration of the easiness of processing and other factors.

Figure 14:
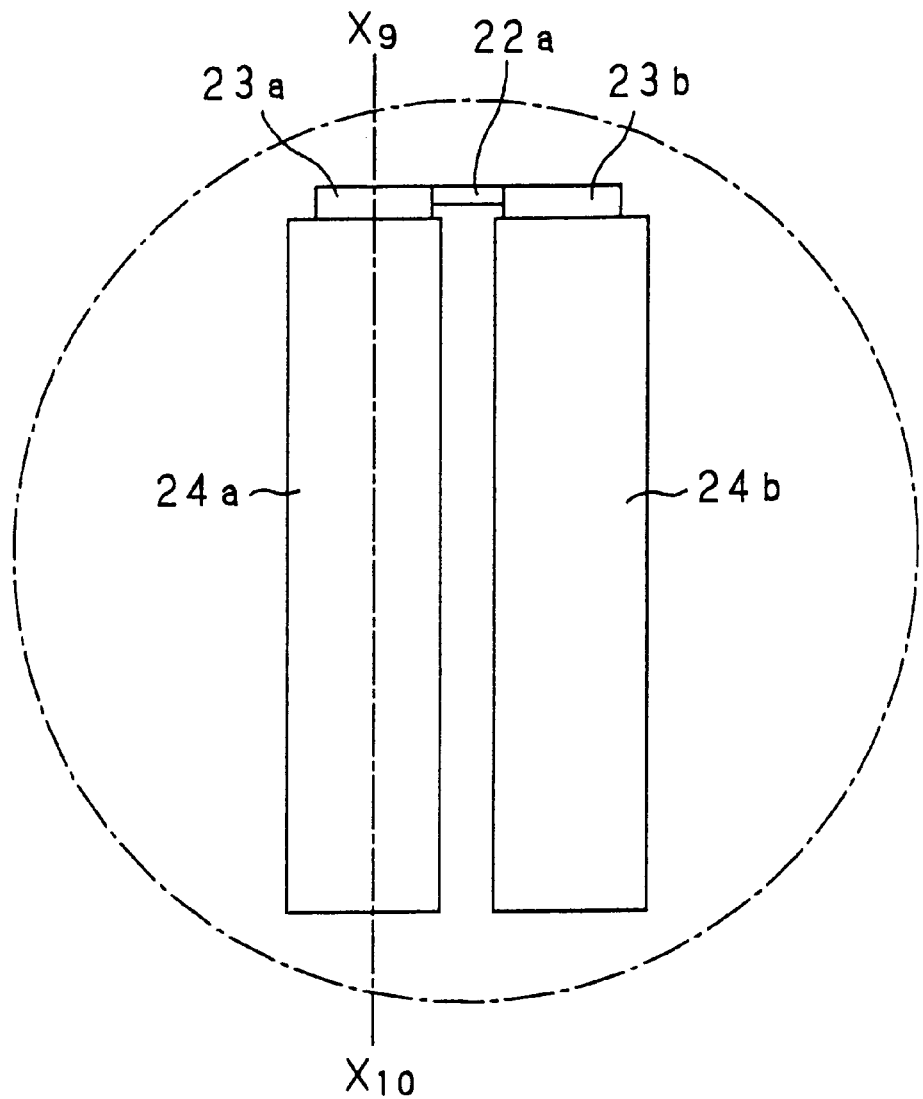
FIG. 14 is a schematic plan view of the substrate, showing the process of patterning a conductive film.

Thereafter, when the masking photoresist is removed, there will be left the MR element 22a, portions 22b and 22c, as shown in FIGS. 14 and 15, which will be the terminals to supply a sense current to the MR element 22a, of the MR element thin film 22.

The MR element 22a has a width $t_6$ of about 4 μm, for example. The width $t_6$ corresponds to the length, namely, depth d, from one to other end of the tape sliding surface of the MR element 22a. Therefore, the depth d of the MR element 22a is about 4 μm, for example in this embodiment. However, the depth d is not limited to this value, but may be appropriately set depending upon the requirements for the magnetic recording/reproducing system in which the MR element is used.

Also the portions 22b and 22c which become the terminals have a length $t_7$ of about 1,500 μm, a width $t_8$ of about 50 μm, and a space $t_9$ of about 10 μm between them, for example.

Next, photolithography is used to replace the portions 22b and 22c with conductive films of a lower electric resistance, thereby forming terminals 24a and 24b to supply a sense current to the MR element 22a, as shown in FIGS. 14 and 15. More particularly, a photoresist is used to first form a mask having openings for the portions 22b and 22c. Next, etching is done to remove the MR element tin film 22 remaining at the portions 22b and 22c which will be the terminals to supply a sense current to the MR element 22a. The masking photoresist is left as it is. Then a conductive layer is formed on the photoresist. The conductive layer is formed by forming, for example, a Ti layer (of 15 nm in thickness), Cu layer (100 nm) and Ti (of 15 nm) in this order on the photoresist by sputtering. Thereafter, the masking photoresist is removed with the conductive layer formed on the photoresist. Thus, the terminals 24a and 24b formed from the conductive layer are provided as shown in FIGS. 14 and 15.

Figure 17:
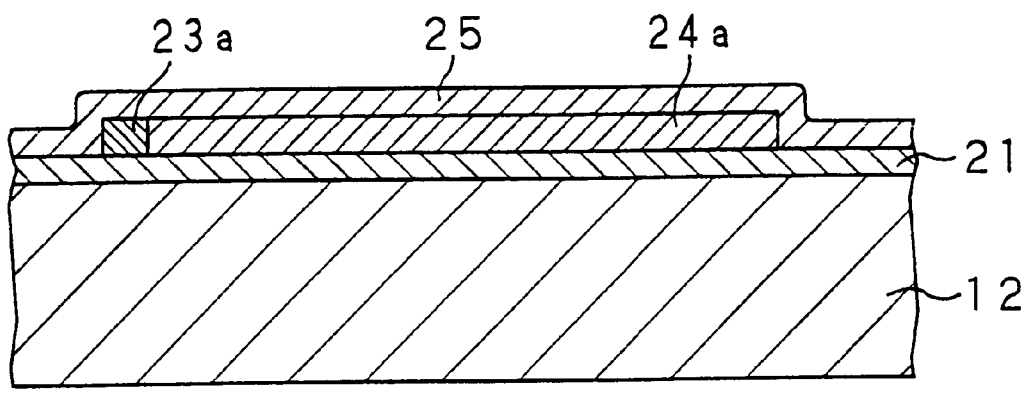
FIG. 17 is a schematic sectional view of the substrate, showing the process of forming the upper-layer gap.

Next, a nonmagnetic, nonconductive layer 25 which will be an upper-layer gap of the magnetic head element 13 is formed by sputtering or otherwise as shown in FIGS. 16 and 17. The nonmagnetic, nonconductive layer 25 should preferably be formed from $Al_2O_3$ in consideration of the insulating property and abrasion resistance. The nonmagnetic, nonconductive layer 25 may have a thickness set appropriately according to a frequency of a to-be-recorded signal and other factors, more specifically, 180 nm or so for example.

Figure 18:
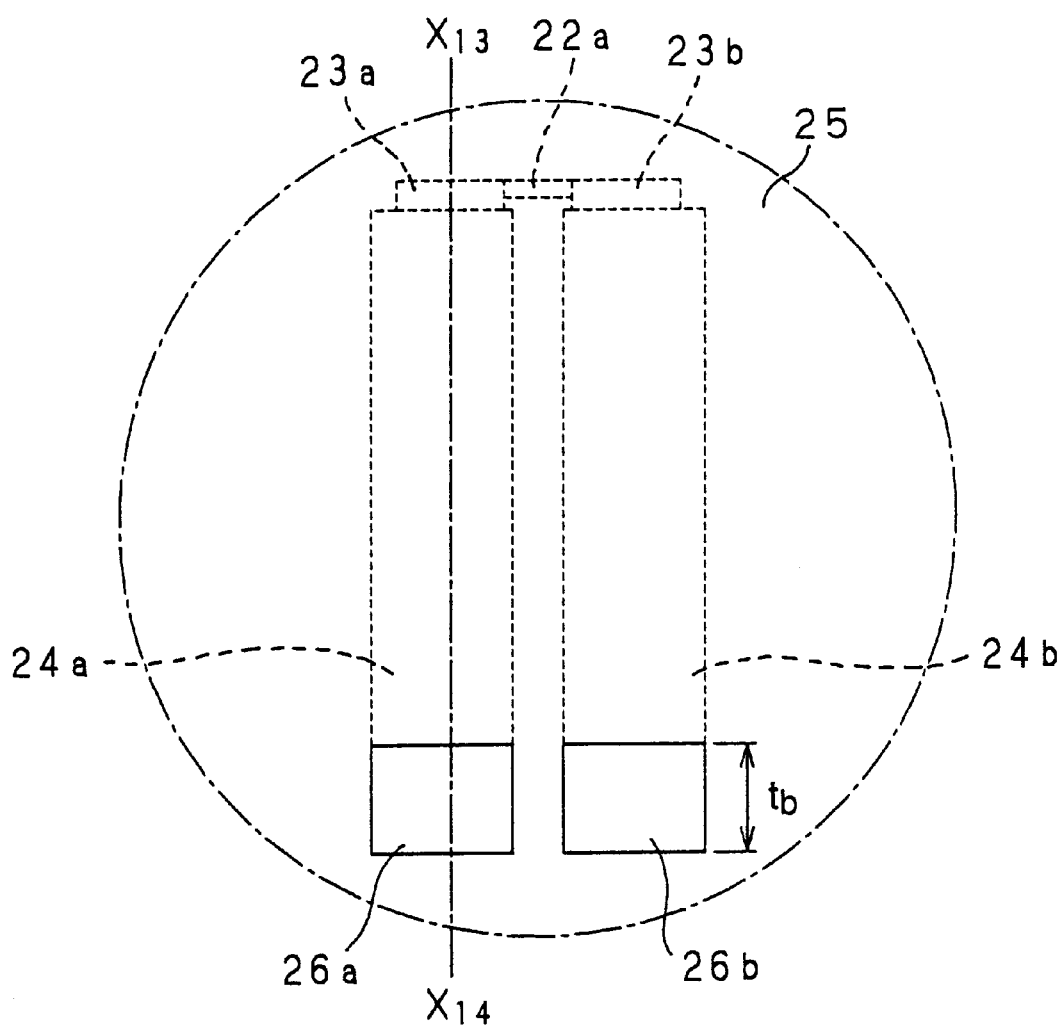
FIG. 18 is a schematic plan view of the substrate, showing the process of forming outside terminals.
Figure 19:
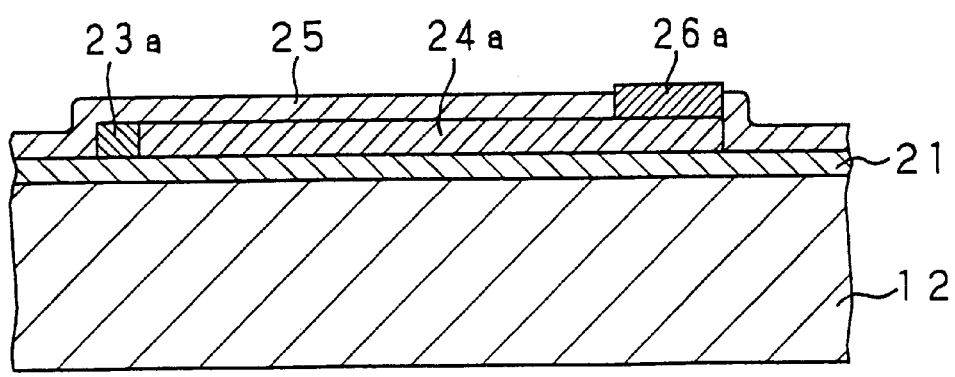
FIG. 19 is a schematic sectional view of the substrate, showing the process of forming the outside terminals.

Next, external terminals 26a and 26b for electrical connection to outside are formed at one ends of the lead-out conductors 24a and 24b, namely, the above-mentioned terminals as shown in FIGS. 18 and 19. More particularly, a photoresist is first applied and a photoresist pattern in which only the photoresist for portions which will be the external terminals 26a and 26b are removed by photolithography. The external terminals 26a and 26b will be formed at the longitudinal ends of the lead-out conductors 24a and 24b, respectively, which are not connected to the permanent magnet layers 23a and 23b. Also, the length $t_b$ of the external terminals 26a and 26b are about 600 μm, for example, from the ends of the lead-out conductors 24a and 24b. Next, the photoresist is used as mask and the nonmagnetic, nonconductive layer 25 exposed from the masking photoresist is removed by etching. It will be appreciated that this etching may be done in either of dry and wet modes. However, ion etching is preferable in consideration of the easiness of processing and other factors.

Next, with the photoresist pattern left as it is, conductive layers for the external terminals are formed. More particularly, a Cu later of 500 nm in thickness and Au layer of 500 nm are formed in this order by sputtering or other method to form the conductive layers for the external terminals. Then, the photoresist is removed along with the external terminal conductive layers formed thereon, and thus the external terminals 26a and 26b are formed at the ends of the lead-out conductors 24a and 24b.

Figure 20:
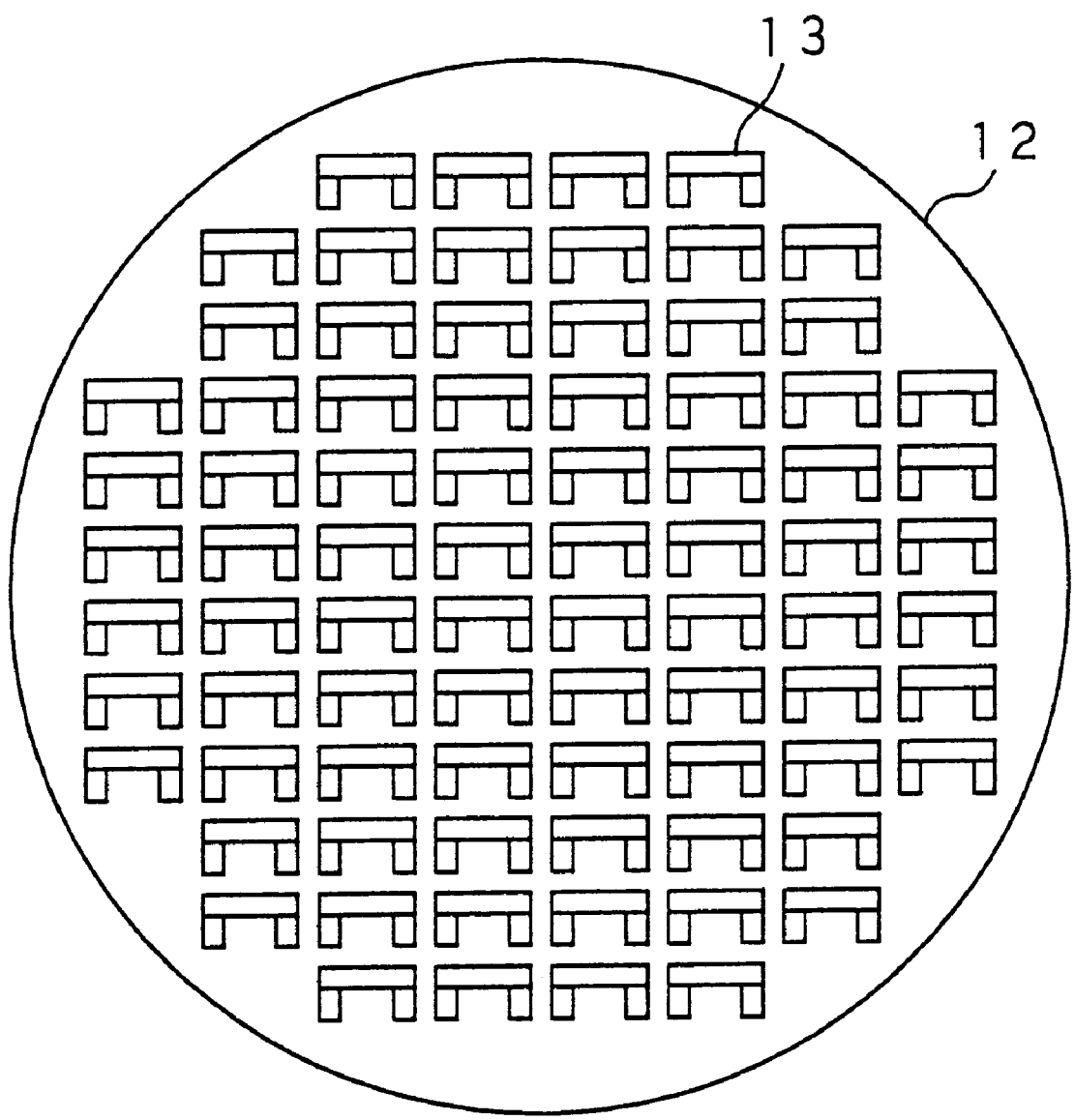
FIG. 20 is a schematic plan view of the substrate on which a plurality of MR elements is formed.

With the above-mentioned processes, the MR element 13 is completely formed on the first substrate 12, and thus a plurality of the MR elements 13 is formed on the first substrate 12 as shown in FIG. 20.

Figure 21:
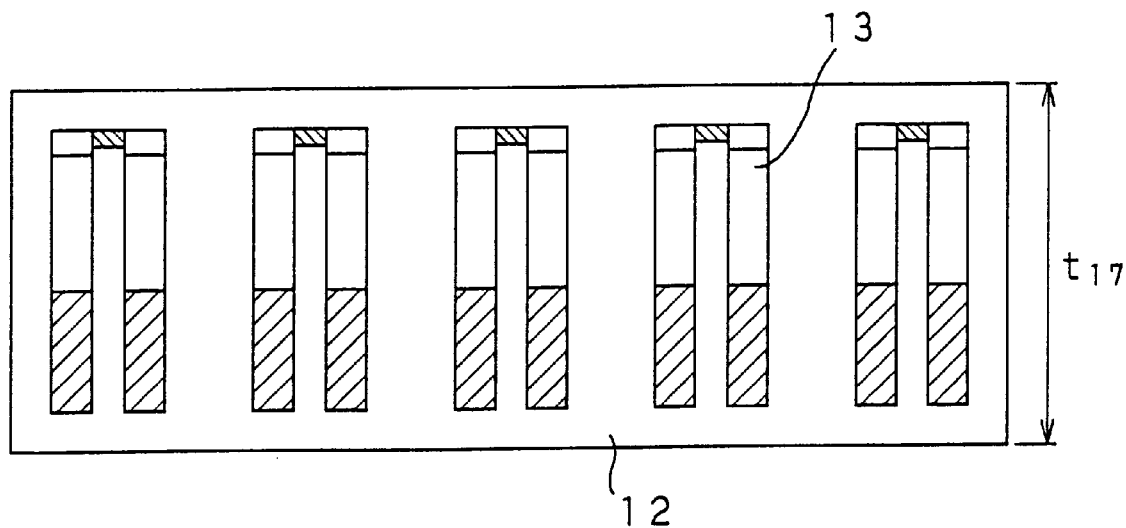
FIG. 21 is a schematic plan view of the substrate, showing the processing of cutting the substrate into a block in which the MR elements are laid horizontally.

Next, the first substrate 12 having the plurality of MR elements 13 formed thereon is cut into rectangular blocks each having the MR elements 13 laid along the length thereof, as shown in FIG. 21. The MR elements laid on each rectangular block should desirably as many as possible to attain a higher productivity. For the simplicity of the illustration, only five such MR elements in one rectangular block are shown in Figures, but the number of them may be greater in practice. The block has a width $t_{17}$ of 1,500 μm.

Figure 22:
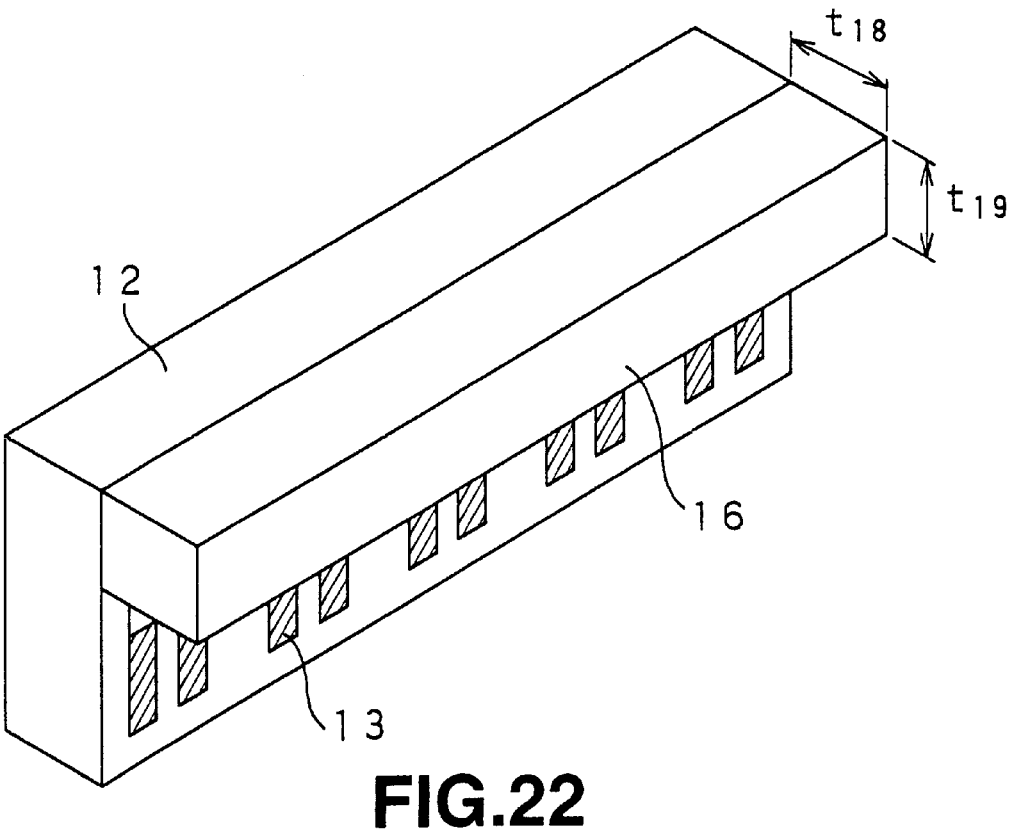
FIG. 22 is a schematic perspective view of the substrate, showing the process of laminating a second substrate to the substrate in FIG. 21.

As shown in FIG. 22, a second substrate 16 having a thickness $t_{18}$ of about 700 μm, for example, is joined to the rectangular block cut from the first substrate 12. The second substrate 16 serves as a guard member at the rear end in the tape sliding direction and as the upper-layer shield of the MR head. The second substrate 16 is bonded to the rectangular block 13 using a synthetic adhesive, for example. The second substrate 16 has a height $t_{19}$ smaller than the height $t_{17}$ of the first substrate 12 so that the external terminals 21a and 21b of the MR element are exposed for the convenience of connection from outside. The seconds substrate 16 is formed from a hard soft magnetic material such as Ni—Zn ferrite or Mn—Zn ferrite.

Figure 23:
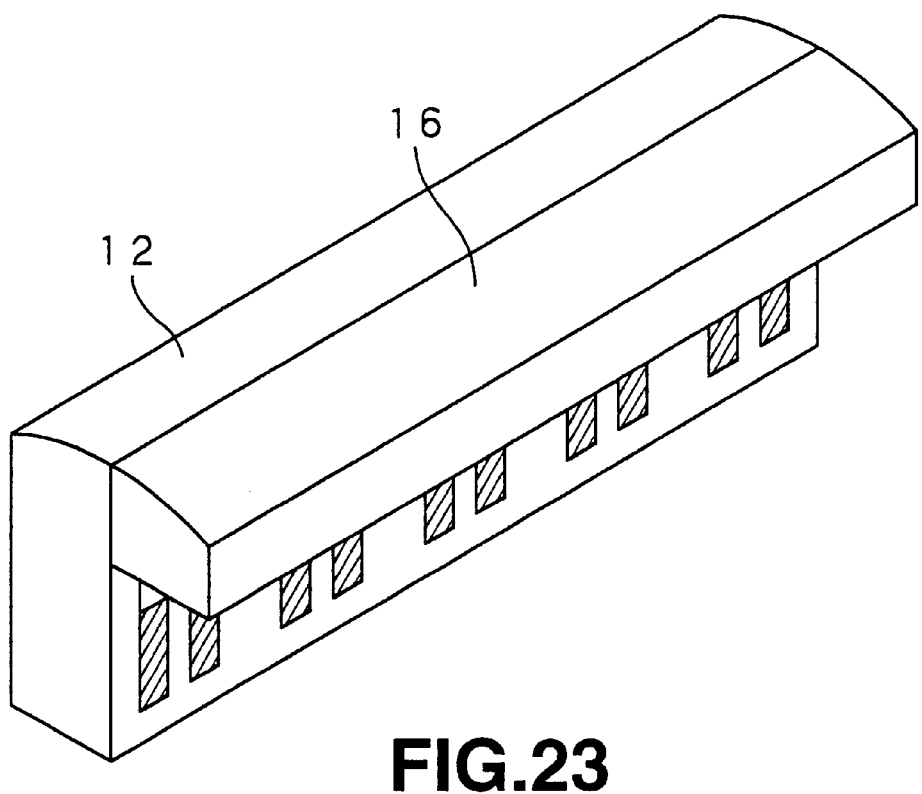
FIG. 23 is a schematic perspective view of the laminated substrates in FIG. 22, showing the process of cylindrically grinding the sliding surface thereof.

Next, a surface portion of the MR element, namely, assembly of the first and second substrates 12 and 13 that will be a tape sliding surface is ground to have an arcuate shape as shown in FIG. 23. More particularly, each rectangular block including the row of MR elements is cylindrically ground until the forward end of the MR element 22a is exposed to the tape sliding surface and has a predetermined depth d. Thus, the tape sliding surface has an arcuate shape as shown in FIG. 23. It should be noted that the cylindrical grinding shape of the tape sliding surface may be appropriate for a tape tension or other factor, but not limited to any special one.

Figure 24:
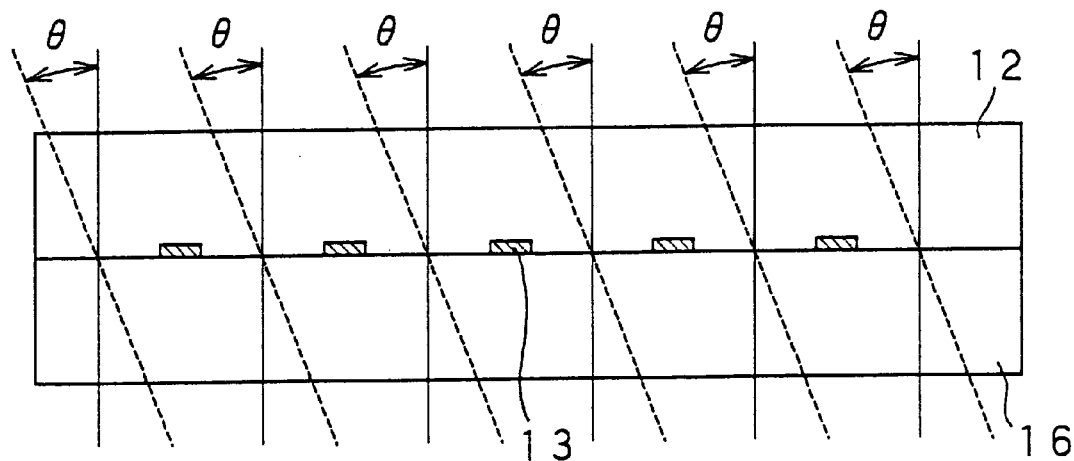
FIG. 24 is a schematic plane view of the laminated substrates in FIG. 22, showing the process of cutting the substrates into head chips.

Finally, the rectangular block, namely, the row of MR elements therein, is cut into individual MR elements, as shown in FIG. 24, for a magnetic tape path on each individual MR element to have a height of about 1,400 μm, width of about 200 μm and height of about 1,500 μm, for example. As will be seen from FIG. 24, the rectangular block is cut not perpendicular but at an angle θ, to the plate in which the first and second substrates 12 and 13 are joined to each other. The angle θ may be varied depending upon the requirements for the magnetic recording/reproducing system in which the MR element is used. The angle θ should be with a range of 5° to 45° or so for the aforementioned reason. In this embodiment, the angle θ is set 25°. This cutting angle θ is an angle of the magnetic head element 13 in relation to the head moving direction, so-called azimuth angle.

Figure 2:
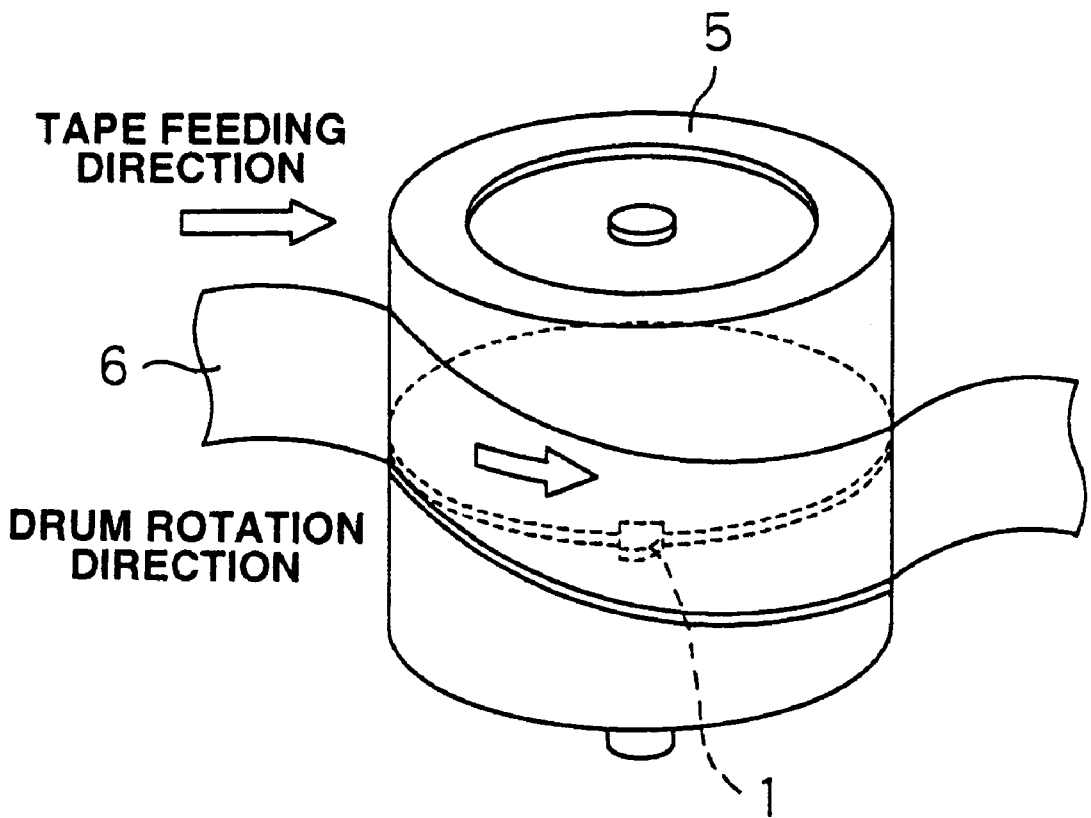
FIG. 2 is a schematic perspective view of an example of rotating drum having installed thereon the MR head according to the present invention.

For use of the magnetic head 1 thus produced, it is attached to a chip base, and the aforementioned external terminals 21a and 21b are electrically connected to terminals provided on the chip base. Then the magnetic head 1 thus attached to the chip base is installed on a rotating drum 4 as shown in FIG. 2.

When the magnetic head 1 has an azimuth angle of 0°, namely, when the MR element is disposed perpendicularly to the head moving direction, a recording track recorded on a tape-shaped recording medium has to be perpendicular to the head moving direction because if the direction of the reading head is not parallel to that of the recording pattern, a so-called azimuth loss will take place, causing the reproduction output to be considerably reduced. Also, when the azimuth angle is 0°, the magnetic transition direction of a recoding track is parallel to that of an adjacent recording track. No problem will take place so long as the magnetic head 1 traces a completely same track as a recorded track. However, if the magnetic head 1 traces a track a little shifted from the recorded track, it will read a track signal from the adjacent track. In a helical scanning recording/reproduction using a rotating drum, it is difficult to trace a recording track with a high precision because of the scanning mechanism. Also, there is a measure to space recording tracks from each other to avoid detection of a signal from a neighboring track. However, the recording medium has to be increased in area, which will result in a reduced recoding density.

Figure 25:
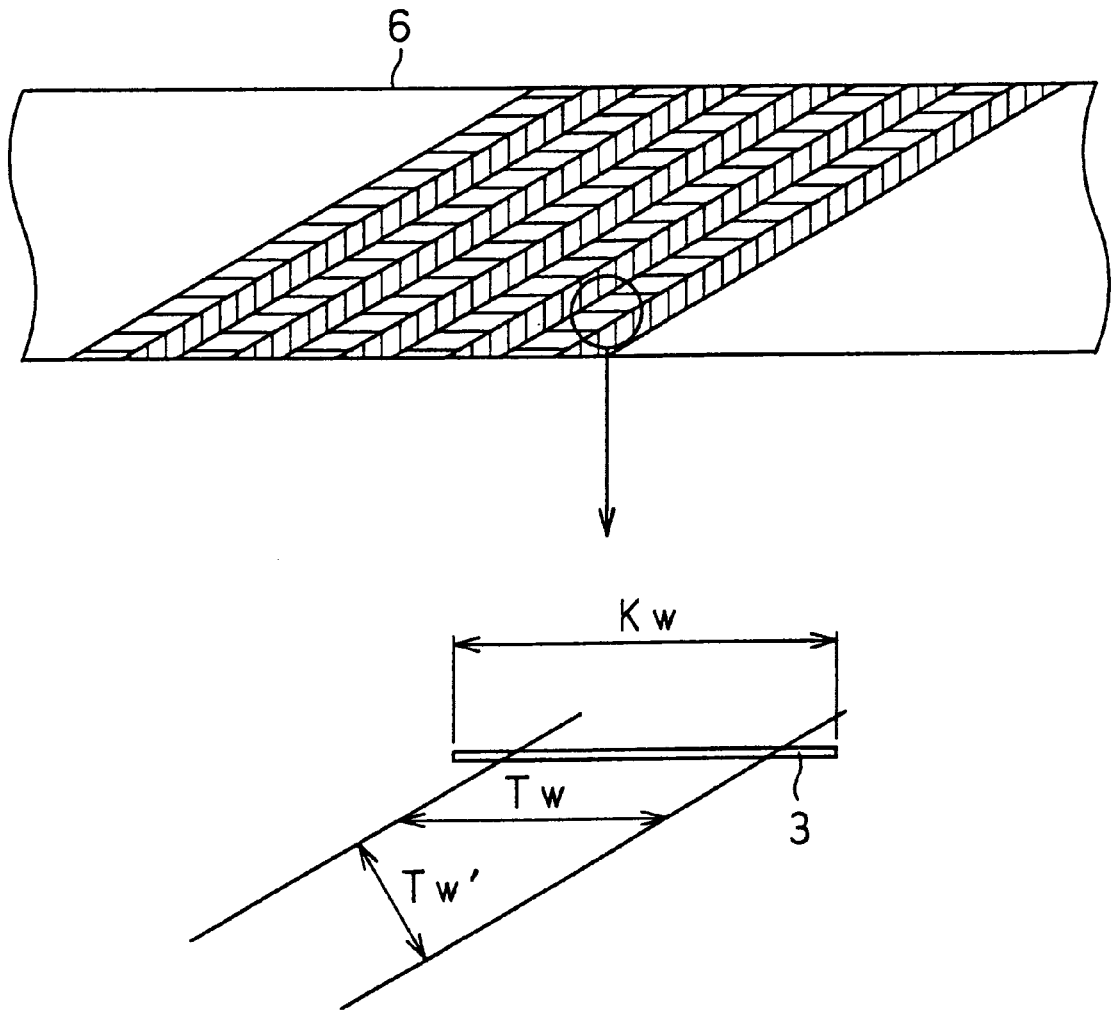
FIG. 25 is a schematic drawing of a pattern of recording by the MR head.

On the contrary, in the magnetic head having the aforementioned azimuth angle according to the present invention, since the magnetic transition direction of a recording track onto which recording is going to be done is adjacent to a neighboring recording track with a angular deviation of double the azimuth angle as shown in FIG. 25, the reading magnetic head detects only a small signal from the neighboring track because of an azimuth loss, even when deviated from on the recording track. This feature can be utilized for the reading magnetic head to be able to faithfully trace a recording track. For this purpose, the magnetic sensor of the magnetic head element 3 is designed to have a width $K_w$ larger than an effective width $T_w$ of the recording track and is servo-controlled to provide a maximum output. Since a recording track is not influenced by a neighboring one, the recording tracks may not be spaced from each other and thus a high density of recording and reproduction can be attained.

Furthermore, the width $T_w'$ in the track pitch direction of the magnetic head element 3 is so small as $1/\cos\theta$ of an azimuth angle $\theta$ when viewed from the head moving direction. On the assumption that there are two magnetic heads: one having no azimuth angle and the other having an azimuth angle, both having a same effective track width $T_w$, the latter magnetic head will occupy a smaller area of the track. Therefore, the magnetic head having an azimuth angle is advantageous in the capability of a high recording density.

As having been described in the foregoing, a reading magnetic head is produced in the same manner as a one having no azimuth angle but much more advantageous than the latter. Therefore, it will be an indispensable means for the future high-density magnetic recording/reproduction system.

Using the aforementioned MR head for reading in combination with a helical scanning magnetic recording system, it is possible to build a recording system having an incomparably high recording density. Such a recording/reproducing system will be described in the following.

The magnetic recording/reproducing apparatus incorporating the helical scanning magnetic recording system, which will be discussed herebelow, uses a rotating drum having installed thereon the aforementioned MR head as the reading magnetic head.

Figure 26:
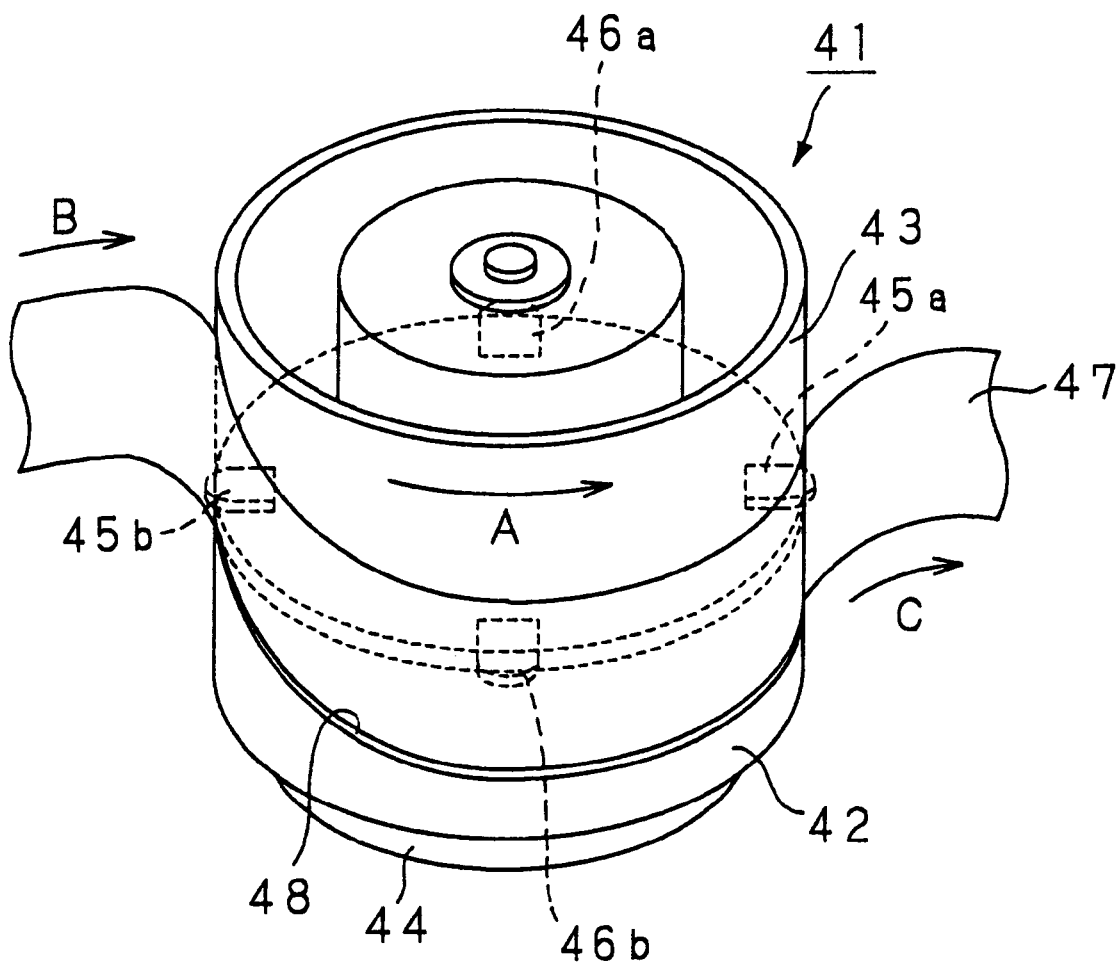
FIG. 26 is a schematic perspective view of an example of rotating drum used in the magnetic recording/reproducing apparatus of helical scanning type.
Figure 27:
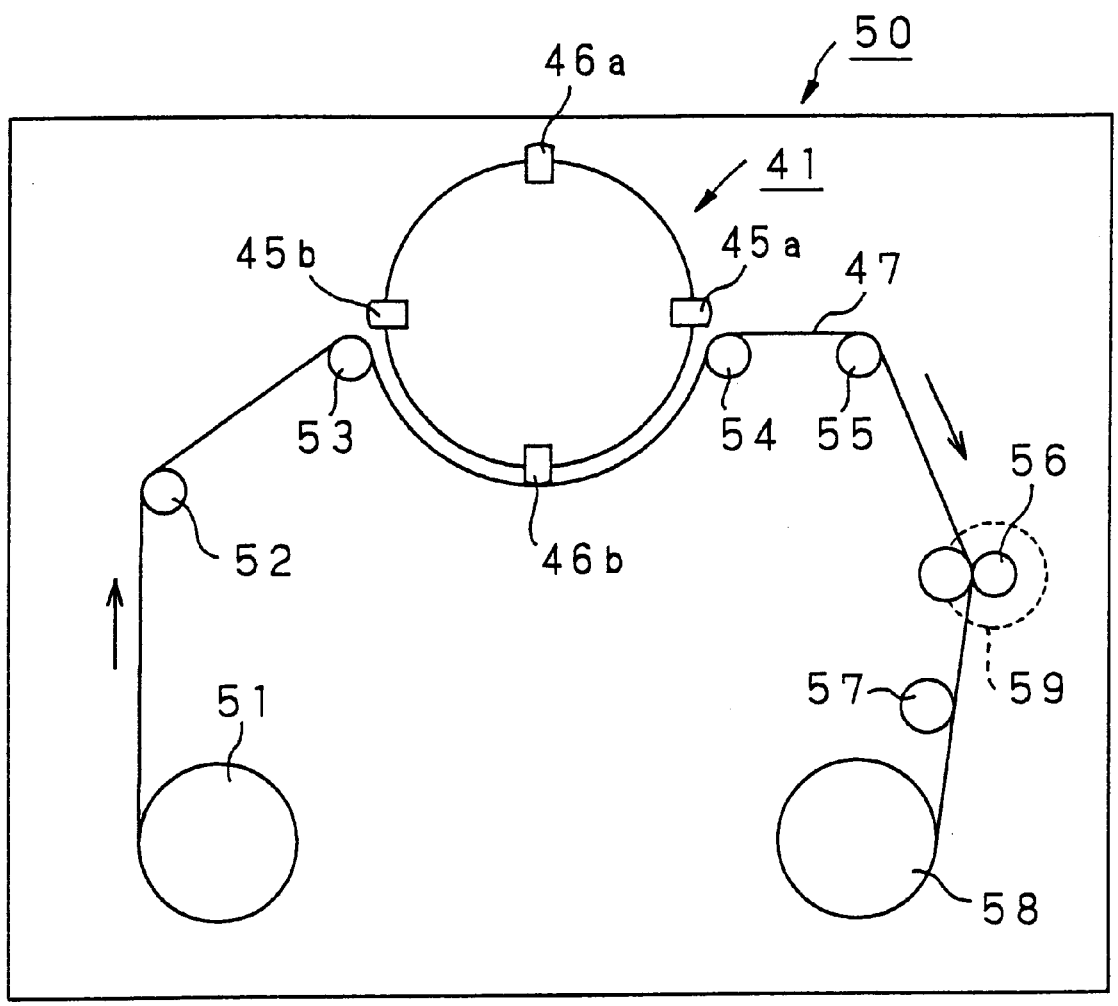
FIG. 27 is a schematic plan view of an example of magnetic tape feeding mechanism including the rotating drum in FIG. 26.

An example of the configuration of a rotating drum unit employed in the magnetic recording/reproducing apparatus is shown in FIGS. 26 and 27. FIG. 26 is a perspective view schematically showing a rotating drum unit 41 and FIG. 27 is a plan view schematically illustrating a magnetic tape feeding mechanism 50 incorporating the rotating drive unit 41.

As seen from FIG. 26, the rotating drum unit 41 comprises a stationary cylindrical drum 42, moving cylindrical drum 43, motor 44 to drive the rotating drum 43, a pair of inductive type magnetic heads 45a and 45b installed on the rotating drum 43, and a pair of MR heads 46a and 46b also installed on the rotating drum 43.

The stationary drum 42 is held, not rotating. The stationary drum 42 has a leading guide 48 formed on the lateral side thereon along the feeding direction of a magnetic tape 47. As will be described later, the magnetic tape 47 is fed along the leading guide 48 during recording and reproduction. The rotating drum 43 is disposed concentrically with the stationary drum 42.

The rotating drum 43 is driven by the motor 44 at a predetermined speed for reading or writing the magnetic tape 47. The rotating drum 43 is formed cylindrical to have a substantially same diameter as the stationary drum 42, and disposed concentrically with the stationary drum 42. The rotating drum 43 has installed on the side thereof opposing the stationary head 42 the pair of inductive type magnetic heads 45a and 45b and the pair of MR heads 46a and 46b.

Each of the inductive type magnetic heads 45a and 45b is a pair of magnetic cores joined to each other with a magnet gap between them and having a coil wound thereon. The inductive type magnetic heads are destined to write signal onto the magnetic tape 47. These inductive type magnetic heads 45a dn 45b are installed on the rotating drum 43 so that they form an angle of 180° with the center of the rotating drum 43 and the magnetic gaps of the magnetic heads 45a and 45b are projected out of the periphery of the rotating drum 43. Note that these inductive type magnetic heads 45a and 45b have azimuth angles, respectively, set reciprocally to each other to write signal to the magnetic tape 47 at the azimuth angle.

On the other hand, the MR heads 46a and 46b have MR elements as magnetic sensor to detect signal from the magnetic tape 47. Namely, they are read-only heads for playback of the magnetic tape 47. These MR heads 46a dn 46b are installed on the rotating drum 43 so that they form an angle of 180° with the center of the rotating drum 43 and the magnetic gaps of the magnetic heads 46a and 46b are projected out of the periphery of the rotating drum 43. Note that these inductive type magnetic heads 46a and 46b have azimuth angles, respectively, set reciprocally to each other to read from the magnetic tape 47 a signal recorded at the azimuth angle on the magnetic tape 47 by the inductive type magnetic heads 45a and 45b.

With this magnetic recording/reproducing apparatus, the magnetic tape 47 is slid on the rotating drum unit 41 to write or read signal onto or from the magnetic tape 47.

More particularly, the magnetic tape 47 is fed from a supply reel 51 over guide rollers 52 and 53 to and wound on the rotating drum unit 41 where it is subjected to read or write. The magnetic tape 47 thus read or written at the rotating drum unit 41 is fed back to a take-up reel 58 over guide rollers 54 and 55, capstan 56 and a guide roller 57. Namely, the magnetic tape 47 is fed at a predetermined tension and speed by the capstan 56 driven by a capstan motor 59, and taken up on the take-up reel 58 over the guide roller 57.

The rotating drum 43 is driven by the motor 44 in the direction of arrow A in FIG. 26. On the other hand, the magnetic tape 47 is fed sliding along the leading guide 48 of the stationary drum 42 obliquely in relation to the stationary and rotating drums 42 and 43. Namely, the magnetic tape 47 is fed sliding on the stationary and rotating drums 42 and 43 in the tape feeding direction of arrow B in FIG. 26 along the leading guide 48 from a tape inlet. Thereafter, the magnetic tape 47 is fed in the direction of arrow C in FIG. 26 to a tape outlet.

Next, the internal structure of the rotating drum unit 41 will be described below.

Figure 28:
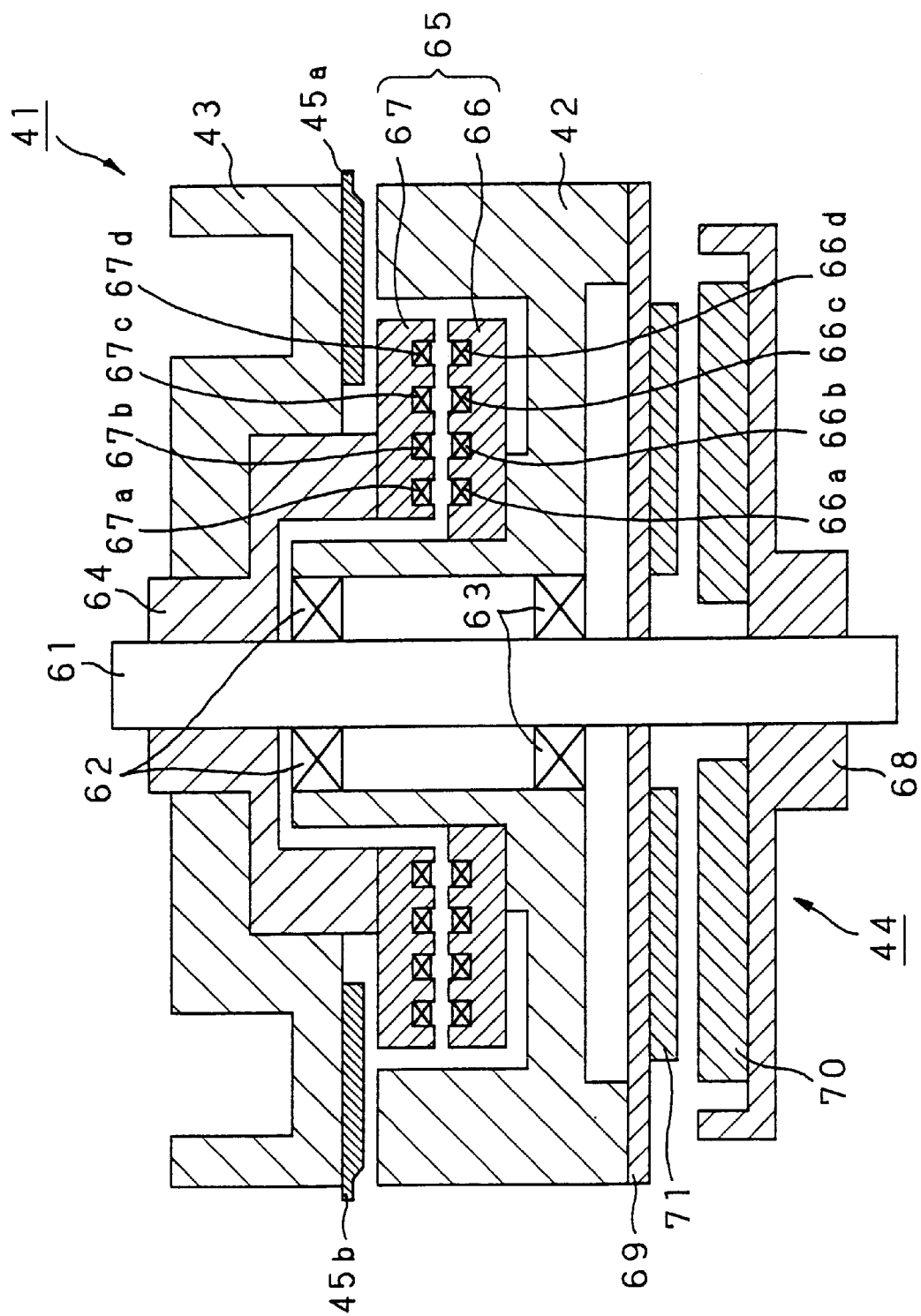
FIG. 28 is a sectional view of the rotating drum, showing the internal construction of the same.

As shown in FIG. 28, a rotating shaft 61 is inserted in the center of the stationary and rotating drums 42 and 43. Note that these stationary and rotating drums 42 and 43 and rotating shaft 61 are made of a conductive material. Namely, they are electrically conductive and the stationary drum 42 is grounded.

There are provided inside the sleeve of the stationary drum 42 two bearings 62 and 63 in which the rotating shaft 61 is supported rotatably in relation to the stationary drum 42. On the other hand, the rotating drum 43 has formed on the inner wall thereof a flange 64 which is fixed at the upper end of the rotating shaft 61. Thus, the rotating drum 43 is rotated along with the rotating shaft 61.

Also, the rotating drum unit 41 has provided inside thereof a rotary transformer 65 being an out-of-contact signal transmitter for signal transfer between the stationary and rotating drums 42 and 43. The rotary transformer 65 has a stator core 66 installed on the stationary drum 42 and a rotor core 67 installed on the rotating drum 43.

The stator and rotor cores 66 and 67 are made of a magnetic material such as ferrite, and formed toroidally about the rotating shaft 61. The stator core 66 has disposed concentrically thereon a pair of signal transmission rings 66a and 66b corresponding to the pair of inductive type magnetic heads 45a dn 45b, a signal transmission ring 66c corresponding to the pair of MR heads 46a and 46b, and a power transmission ring 66d which supplies a power required for driving the pair of MR heads 46a and 46b. Similarly, the rotor core 67 has disposed concentrically thereon a pair of signal transmission rings 67a and 67b corresponding to the pair of inductive type magnetic heads 45a dn 45b, a signal transmission ring 67c corresponding to the pair of MR heads 46a and 46b, and a power transmission ring 67d which supplies a power required for driving the pair of MR heads 46a and 46b.

The above rings 66a, 66b, 66c, 66d, 67a, 67b, 67c and 67d are formed each from a coil wound toroidally about the rotating shaft 61. The rings 66a, 66b, 66c and 66d of the stator core 66 are disposed opposite to the rings 67a, 67b, 67c and 67d, respectively, of the rotor core 67. The rotary transformer 65 thus constructed transmits signal and power in an out-of-contact manner between the rings 66a, 66b, 66c and 66d of the stator core 66 and rings 67a, 67b, 67c and 67d of the rotor core 67.

Furthermore, the rotating drum unit 41 has coupled thereto a motor 44 which drives to rotate the rotating drum 43. The motor 44 has a rotor 68 and a stator 69. The rotor 68 is installed to the lower end of the rotating shaft 61 and has a drive magnet 70 provided thereon. On the other hand, the stator 69 is installed at the lower end of the stationary drum 42 and has a drive coil 71 mounted on the bottom thereof. When a current is supplied to the drive coil 71, the rotor 68 will be driven to rotate. Thus, the rotating shaft 61 installed to the rotor 68 is rotated and also the rotating drum 43 fixed to the rotating shaft 61 is driven to rotate.

Figure 29:
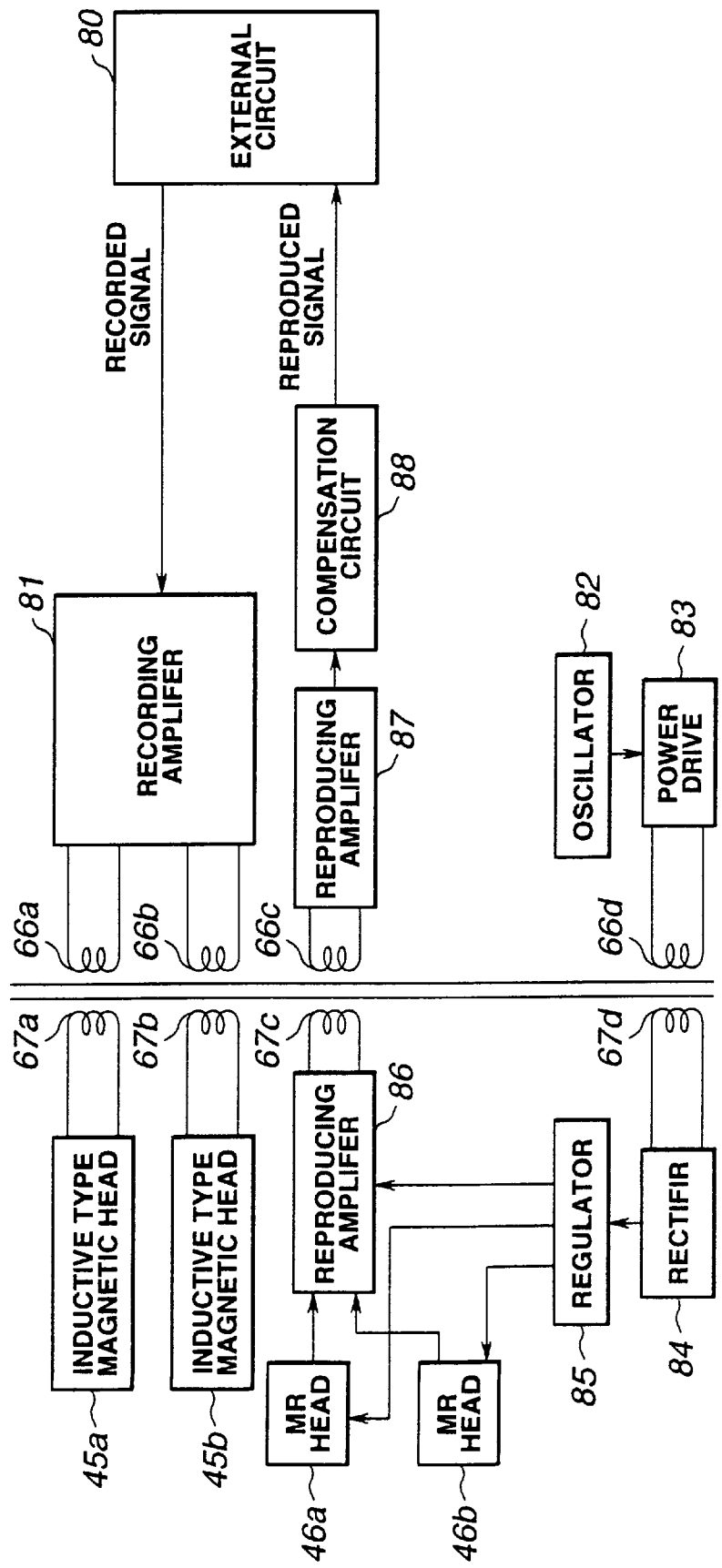
FIG. 29 is a schematic block diagram showing the circuit configuration of the rotating drum and its associated circuits.

Next, recording and reproduction by the rotating drum unit 41 constructed as mentioned in the foregoing will be described with reference to FIG. 29 schematically showing the circuit configuration of the rotating drum unit 41 and its associated circuitry.

For writing signal onto the magnetic tape 47 by the rotating drum unit 41, a current is first supplied to the drive coil 71 of the motor 44 and thus the rotating drum 43 is driven to rotate. While the rotating drum 43 is rotating, a to-be-recorded signal is supplied to a recording amplifier 81 from an external circuit 80 as shown in FIG. 29.

The recording amplifier 81 amplifies the to-be-recorded signal from the external circuit 80, and supplies the amplified signal to the signal transmission ring 66a of the stator core 66 corresponding to one of the inductive type magnetic heads (45a) at a time when signal recording is to be done by the inductive type magnetic head 45a. When signal recoding is to be done by the other inductive type magnetic head 45b, the recording amplifier 81 will supply the amplified signal to the signal transmission ring 66b of the stator core 66 corresponding to the inductive type magnetic head 45b.

Since the pair of inductive type magnetic heads 45a and 45b is disposed to form an angle of 180° with the center of the rotating drum 43 as having previously been described, the inductive type magnetic heads 45a and 45b will write the signal alternately with a phase difference of 180° between them. Namely, the recording amplifier 71 will make an alternate changeover between a timing at which the amplified to-be-recorded signal is to be supplied to one of the inductive type magnetic heads (45a) and a one at which the signal is to be supplied to the other inductive type magnetic head 45b with the phase difference of 180° between them.

The amplified to-be-recorded signal supplied to the signal transmission ring 66a of the stator core 66 corresponding to one inductive type magnetic head 45a is passed to the signal transmission ring 67a of the rotor core 67 in the out-of-contact manner. The signal thus transmitted to the signal transmission ring 67a of the rotor core 67 is supplied to the inductive type magnetic head 45a by which it is written into the magnetic tape 47.

Similarly, the amplified to-be-recorded signal supplied to the signal transmission ring 66b of the stator core 66 corresponding to the other inductive type magnetic head 45b is passed to the signal transmission ring 67b of the rotor core 67 in the out-of-contact manner. The signal supplied to the signal transmission ring 67b of the rotor core 67 is passed to the inductive type magnetic head 45b by which it is recorded onto the magnetic tape 47.

For reproducing a signal from the magnetic tape 47 by the rotating drum unit 41, a power is first supplied to the drive coil 71 of the motor 44 and thus the rotating drum 43 is driven to rotate. While the rotating drum 43 is rotating, a high-frequency current is supplied to a power drive 83 from an oscillator 82 as shown in FIG. 29.

The HF current from the oscillator 72 is converted to a predetermined AC current by the power drive 83 and then supplied to the power transmission ring 66d of the stator core 66. The AC current supplied to the power transmission ring 66d of the stator core 66 is transmitted to the power transmission ring 67d of the rotor core 67 in the out-of-contact manner. The AC current transmitted to the power transmission ring 67d of the rotor core 67 is rectified to a DC current by a rectifier 84 and supplied to a regulator 85 which regulates the DC current to a predetermined voltage.

The current having set to the predetermined voltage by the regulator 85 is supplied as sense current to the pair of MR heads 46a and 46b. The MR heads 46a and 46b have connected thereto a reproducing amplifier 86 to which the current is also supplied from the regulator 85.

The MR head 46a and 46b have the MR elements, respectively, of which the resistance varies depending upon the magnitude of external magnetic field. Namely, the MR elements of the MR heads 46a and 46b are varied in resistance by a signal magnetic field from the magnetic tape 47 so that the sense current will reflect a voltage variation due to the resistance variation.

The reproducing amplifier 86 provides, as reproduced signal, a signal corresponding to the voltage variation. It should be noted that the reproducing amplifier 86 is adapted to provide a reproduced signal detected by the MR head 46a at a timing at which signal reproduction is to be done by one of the MR heads (46a), and a reproduced signal detected by the other MR head 46b at a timing at which signal reproduction is to be done by the other MR head 46b.

Since the pair of MR heads 46a and 46b is disposed to form an angle of 180° with the center of the rotating drum 43 as having previously been described, the MR heads 46a and 46b will read the signal alternately with a phase difference of 180° between them. Namely, the reproducing amplifier 86 will make an alternate changeover between a timing at which the amplified to-be-recorded signal is to be supplied to one of the MR heads (46a) and a one at which the signal is to be supplied to the MR head 46b with the phase difference of 180° between them.

The reproduced signal from the reproducing amplifier 86 is supplied to the signal transmission ring 67c of the rotor core 67 and transmitted from the ring 67c to the signal transmission ring 66c of the stator core 66 in the out-of-contact manner. The reproduced signal transmitted to the signal transmission ring 66c of the stator core 66 is amplified by another reproducing amplifier 87 and then supplied to a compensation circuit 88 where it is subjected to a predetermined compensation and then delivered to the external circuit 80.

In the circuit configuration shown in FIG. 29, the pair of inductive type magnetic heads 45a ad 45b, pair of MR heads 46a and 46b, rectifier 84, regulator 85 and reproducing amplifier 86 are mounted on the rotating drum 43 and rotated along with the rotating drum 43. On the other hand, the recording amplifier 81, oscillator 82, power drive 83, reproducing amplifier 87 and compensation circuit 88 are disposed on a stationary portion of the rotating drum unit 41 or included in an external circuit formed separately from the rotating drum unit 41.

Figure 30:
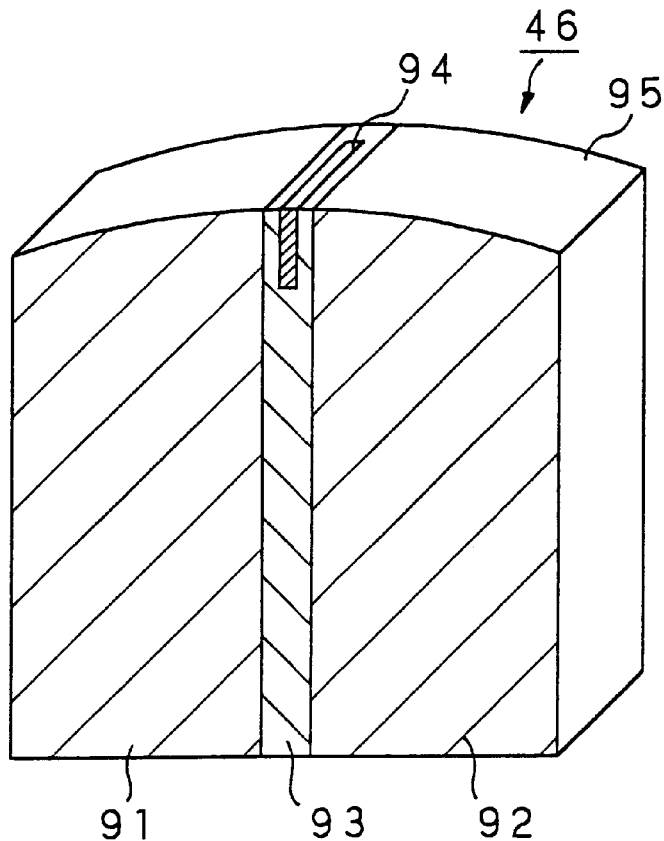
FIG. 30 is a partially fragmentary perspective view of an example of MR head installed in the rotating drum in FIG. 26

Next, the MR heads 46a and 46b installed on the rotating drum 43 will be further described with reference to FIG. 30. Note that the MR heads 46a and 46b have an identical structure except that their azimuth angles are reciprocal to each other. Therefore, the MR heads 46a and 46b will be collectively referred to as "MR head 46" in the following description.

The MR head 46 is installed on the rotating drum 43 and only reads signal from the magnetic tape 47 by the helical scanning method utilizing the magnetoresistive or magnetic reluctance effect. Generally, the MR head has a higher sensitivity and produces a higher reproduction output than the inductive type magnetic head utilizing the electromagnetic induction for the purposes of signal recording and reproduction. Therefore, the MR head is suitable for use to attain a high density of recording. Using the MR head 46 for reading signal from a magnetic tape will permit to attain a capability of a higher recording density of the magnetic recording/reproducing apparatus.

The MR head 46 has a previously described structure. As shown in FIG. 30, it incorporates a pair of magnetic shields 91 and 92 made of a soft magnetic material such as Ni—Zn polycrystalline ferrite or similar, and an MR element unit 94 having a generally rectangular shape, embedded in an insulator 93 and sandwiched between the pair of shields 91 and 92. Note that a pair of terminals is lead out of the opposite ends, respectively, of the MR element unit 94 and the latter can be supplied with a sense current via these terminals.

The MR element unit 94 is a lamination of an MR element layer, SAL layer and an insulator layer disposed between the MR element and SAL layer. The MR element is made of a soft magnetic material of which the resistance varies depending upon an external magnetic field under the anisotropic magnetoresistive or magnetic reluctance effect (AMR), such as Ni—Fe or similar. The SAL layer is intended to apply a bias magnetic field to the MR element by the so-called SAL biasing method, and it is made of a magnetic material showing a low coercivity and high permeability, such as Permalloy or similar. The insulator layer is provided to provide an isolation between the MR element and SAL layer to prevent electrical shunting loss. It is made of an insulative material such as Ta or similar.

The MR element unit 94 is formed to have a generally rectangular shape. It is embedded in the insulator layer 93 and sandwiched between the pair of shields 91 and 92 so its one lateral side is exposed at a magnetic tape sliding surface 95 of the MR head 46. More particularly, the lateral direction of the MR element unit 94 is disposed substantially perpendicularly to the magnetic tape sliding surface 95 while its longitudinal direction is substantially orthogonally to the magnetic tape sliding direction.

The magnetic tape sliding surface 95 of the MR head 46 is cylindrically ground along the sliding direction of the magnetic tape 47 such that one lateral side of the MR element unit 94 is exposed, and also cylindrically ground along a direction orthogonal to the sliding direction of the magnetic tape 47. Thus, the MR head 46 is most convex at the MR element unit 94 or a portion in the proximity to the MR element unit 94 so that the MR element unit 94 has a better contact with the magnetic tape 47.

Figure 31:
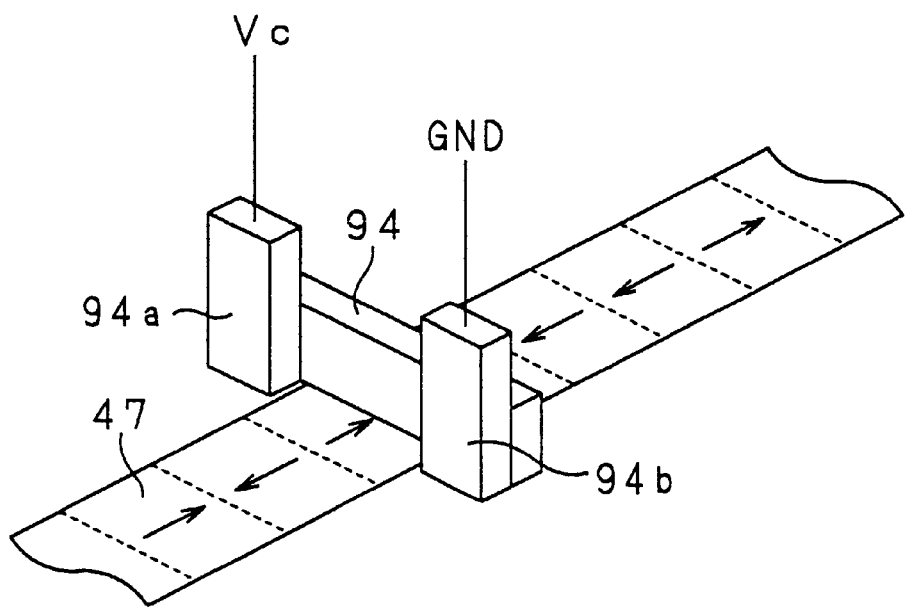
FIG. 31 is a schematic perspective view showing how the MR head reads signal from a magnetic tape.

For reproduction of signal from the magnetic tape 47 by the MR head 46 having such a geometry, the magnetic tape 47 is slid on the MR element unit 94 as shown in FIG. 31. The arrows in FIG. 31 schematically indicate how the magnetic tape 47 is magnetized.

While the magnetic tape 47 is fed sliding on the MR element unit 94, the MR element unit 94 is supplied with a sense current via terminals 94a and 94b connected to the opposite ends of the MR element unit 94, and detects a voltage variation of the sense current. More particularly, the MR element unit 94 is applied with a predetermined voltage Vc from the terminal 94a connected to one end of the MR element unit 94, and the terminal 94b connected to the other end of the MR element unit 94 is connected to the rotating drum 43. The rotating drum 43 is electrically connected to the stationary drum 42 via the rotating shaft 61 and the stationary drum 42 is grounded. Therefore, one of the terminals (94b) connected to the MR element unit 94 is grounded through the rotating drum 43, rotating shaft 61 and stationary drum 42.

When the sense current is supplied to the MR element unit 94 while the magnetic tape 47 is being fed sliding on the MR element unit 94, the MR element formed in the MR element unit 94 has the resistance varied depending upon a magnetic field from the magnetic tape 47, so that a voltage of the sense current will vary. Through detection of this voltage variation of the sense current, a signal magnetic field from the magnetic tape 47 can be detected to reproduce a signal recorded on the magnetic tape 47.

It should be noted that the MR element formed in the MR element unit 94 of the MR head 46 may be an element showing a magnetoresistive effect. It may be a giant magnetoresistive (GMR) element, for example, which is formed from a lamination of more layers to assure a greater magnetoresistive effect. The bias magnetic field may be applied to the MR element by other than the SAL biasing method, for example, any one of the permanent magnet biasing, shunt current biasing, self-biasing, exchange biasing, barber pole biasing, split element biasing, servo biasing, etc. The giant magnetoresistive effect and various biasing methods are referred to the "MAGNETO-RESISTIVE HEADS— Fundamentals and Applications" by John C. Mallinson (translated by Kazuhiko Hayashi), Maruzen, for example.

Next, the magnetic tape 47 used in the embodiment of the present invention will be described herebelow.

The magnetic tape 47 is composed of a nonmagnetic support or substrate and a magnetic metal thin film as a magnetic layer formed on the support. The thickness and remanence of the magnetic metal thin film being the magnetic layer were made smaller than the conventional magnetic tapes to be optimum for the characteristics of he MR reading head.

The thickness of the magnetic metal thin film can be controlled by changing the line speed, and the remanence can be controlled by changing the supply amount of oxygen during evaporation of the thin film.

By controlling these two parameters, it is possible to keep the MR reading head from being saturated and allow the MR reading head to provide a maximum distortion-free output. More particularly, the product Mr·δ of the remanence Mr and thickness δ of the magnetic metal thin film is controlled to 1 to 5 memu/cm².

If product Mr·δ is less than 1 memu/cm², no sufficient reproduction output can be assured. On the contrary, if product Mr·δ exceeds 5 memu/cm², the MR reading head will be saturated, causing a distortion in the reproduction output.

The thickness δ and remanence Mr of the magnetic metal thin film can be freely set within the above range of 1 to 5 memu/cm². However, if the parameters δ and Mr are set too small, it is difficult to assure a product Mr·δ of more than 1 memu/cm². On the contrary, if they are too large, a problematic distortion will take place in the reproduction output.

Therefore, the thickness δ of the magnetic metal thin film should desirably be within a range of 30 to 120 mn, and the remanence Mr be within a range of 200 to 400 emu/cc.

Also the intra-plane coercivity of the magnetic tape 47 should be maintained to be more than 1,000 Oe in order to implement a low noise and high resolution. However, if the coercivity exceeds 2,500 Oe, no sufficient recording will be possible and the reproduction output will be lower. Thus, the coercivity should desirably be within a range of 1,000 to 2,500 Oe.

For compatibility of a high resolution and low noise, the intra-plane rectangular ratio of the magnetic tape 47 should desirably be within a range of 0.6 to 0.9.

The reasons why these parameters are defined as in the above will be further described below on the basis of the results of experiments.

First, a polyethylene terephthalate film of 10 μm in thickness and 150 mm in width was prepared first. A water-soluble latex containing acryl ester as the base was applied to the film surface to a density of 10,000,000/mm² to form an undercoat.

Then, a Co—O magnetic metal thin film was formed on the undercoat under the following conditions:

| Film forming conditions: | |
|---|---|
| Ingot | Co |
| Angle of incidence | 45°–90° |
| Tape line speed | 0.17 m/sec |
| Oxygen supply rate | 3.3 × 10⁻⁶ m³/sec |
| Vacuum degree during evaporation | 7 × 10⁻² Pa |

Figure 32:
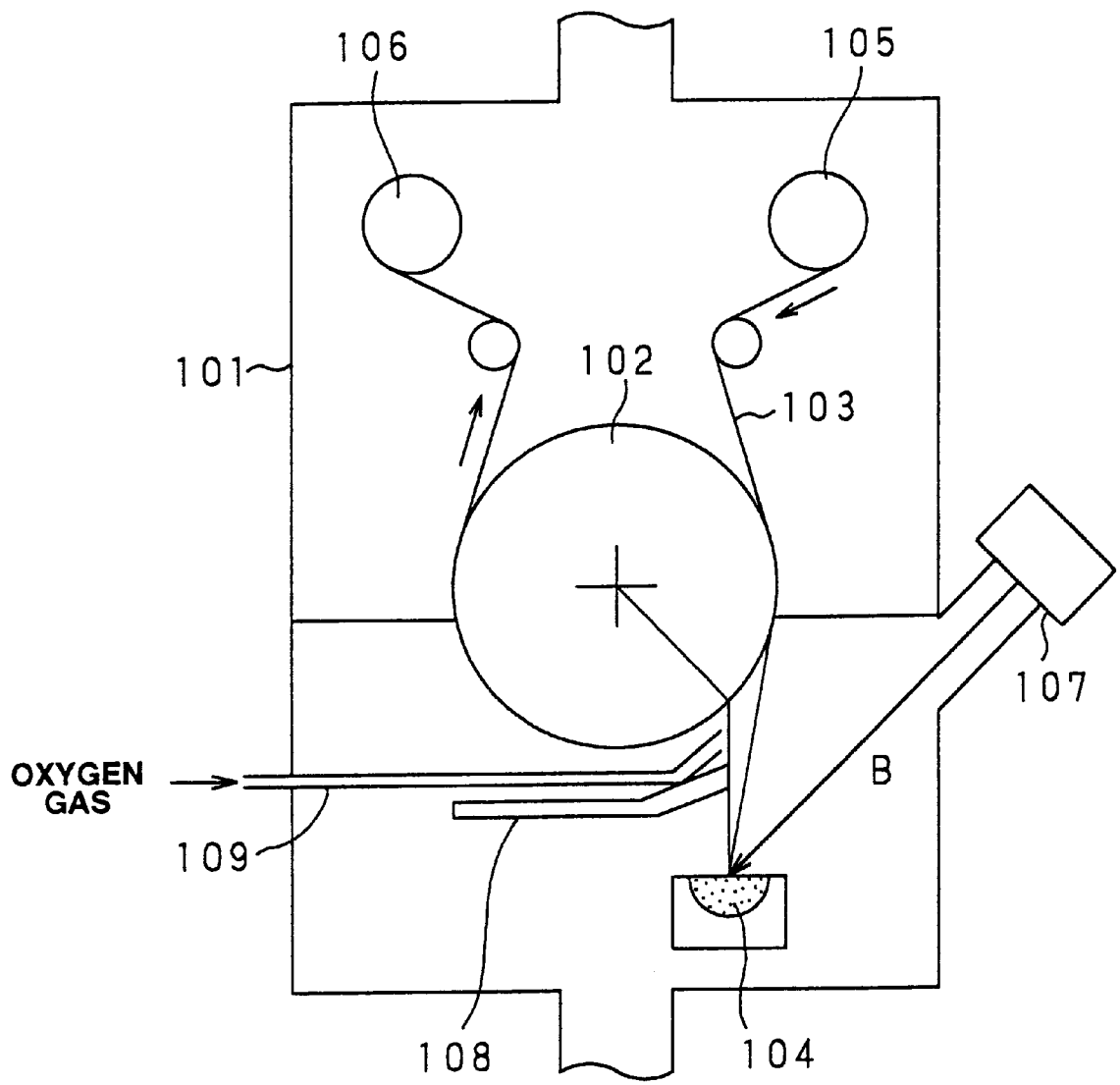
FIG. 32 is a schematic illustration of an example of continuous take-up evaporation machine.

A continuous take-up type evaporation equipment as shown in FIG. 32 was used which comprises a vacuum chamber 101 having disposed therein a cooling can 102, evaporator 104 opposing the cooling can 102, supply roll 105 and take-up roll 106. Inside the vacuum chamber 101, a nonmagnetic support 103 is fed from the supply roll 105, moved around the cooling can 102 and taken up by the take-up roll 106. While the magnetic support 103 is being fed along the cooling can 102, it has a magnetic metal thin film evaporated thereon.

The evaporator 104 is heated by an electron beam B irradiated from an electron beam source 107 to generate a flow of steam from a heated metallic material. A shutter 108 is provided to limit the angle of incidence of the steam flow upon the nonmagnetic support 103 and also an oxygen supply pipe 109 is provided in the proximity of the shutter 108 to mix a very small amount of oxygen into the steam flow.

In the magnetic recording medium thus produced, the magnetic easy axis in which no demagnetizing field was considered was found inclined about 20° in relation to the main surface of the magnetic metal thin film.

Thereafter, a carbon film of about 10 nm was formed by sputtering or CVD method on the magnetic layer thus formed Then, a backcoat of carbon and polyurethane was formed to a thickness of 0.6 μm on the side of the nonmagnetic support 103 opposite to the magnetic layer, and a lubricant of perfluoropolyether was applied to the surface of the carbon film. After that, the nonmagnetic support 103 was cut to a width of 8 mm to form a magnetic tape.

The sample tape was tested on the electromagnetic conversion characteristic thereof. More particularly, a modified 8-mm VTR was used to record information signal at a recording wavelength of 0.5 μm onto each sample tape. Each sample tape was read by using the shielded MR head. The reproduced output was measured for its noise level and error rate.

The element of the MR head used to reproduce the sample tapes was an FeNi-AMR (anisotropic magnetoresistive effect element) having a saturation magnetization of 800 emu/cc and a layer thickness of 40 nm. The MR element was shielded by NiZn and inter-shield distance was 0.17 μm. The track width was 18 μm and azimuth angle was 25°. The measurement was done of twenty types of embodiment 1 to 20 and eight types of comparative examples 1 and 8.

The measured reproduction output (recorded at the wavelength of 0.5 μm) when the product Mr·δ (remanence Mr by thickness δ) of the magnetic metal thin film and the noise level (frequency 1 MHz lower than the carrier signal) are shown in Table 1.

In Table 1, the product Mr·δ of the comparative example 1 was set to 0.5 memu/cm², that of the embodiment 1 was to 1.0 memu/cm², that of the embodiment 2 was set to 2.0 memu/cm², that of the embodiment 3 was to 3.0 memu/cm², that of the embodiment 4 was to 4.0 memu/cm², that of the embodiment 5 was to 5.0 memu/cm², and that of the comparative example 2 was to 6.0 memu/cm². The reproduction outputs and noise levels take, as their bases, those of the embodiment 1. The error rate is a symbol error rate.

TABLE 1

| | Mr·δ (memu/cm²) | Reproduction output (dB) | Noise level (dB) | Error rate |
|---|---|---|---|---|
| Comparative example 1 | 0.5 | −3.4 | −2.0 | 2 × 10⁻⁴ |
| Embodiment 1 | 1.0 | 0 | 0 | 7 × 10⁻⁵ |
| Embodiment 2 | 2.0 | 3.2 | 2.0 | 3 × 10⁻⁵ |
| Embodiment 3 | 3.0 | 4.3 | 2.8 | 5 × 10⁻⁵ |
| Embodiment 4 | 4.0 | 6.1 | 3.4 | 7 × 10⁻⁵ |
| Embodiment 5 | 5.0 | 7.3 | 4.2 | 1 × 10⁻⁴ |
| Comparative example 2 | 6.0 | 7.2 (with distortion) | 5.5 | 5 × 10⁻³ |

As apparent from Table 1, when the product Mr·δ is less than 1 memu/cm² (as in the comparative example 1), no sufficient reproduction output was obtainable. When the product Mr·δ exceeds 5 memu/cm² (as in the comparative example 2), the MR element was saturated so that the reproduced waveform distorted and error rate was poor. Therefore, it can be said that the product Mr·δ should desirably be within the range of 1 to 5 memu/cm².

Table 1 shows the products Mr·δ, a same product Mr·δ can include a limitless number of possible combinations of remanence Mr and film thickness δ. Therefore, such combinations were considered in further detail.

Table 2 shows the reproduction outputs, noise levels and error rates when the film thickness δ of the magnetic metal thin film was changed. In Table 2, the reproduction outputs and noise levels take, as their bases, those of the embodiment 6. The remanence of the thin film was 360 emu/cc for all the embodiments and comparative examples.

TABLE 2

|  | Film thickness (nm) | Reproduction output (dB) | Noise level (dB) | Error rate |
|---|---|---|---|---|
| Comparative example 3 | 20 | −3.2 | −1.8 | $2 \times 10^{-4}$ |
| Embodiment 6 | 30 | 0 | 0 | $9 \times 10^{-5}$ |
| Embodiment 7 | 50 | 3.6 | 1.4 | $7 \times 10^{-5}$ |
| Embodiment 8 | 80 | 5.3 | 2.8 | $5 \times 10^{-5}$ |
| Embodiment 9 | 100 | 6.2 | 3.7 | $3 \times 10^{-5}$ |
| Embodiment 10 | 120 | 7.4 | 4.3 | $7 \times 10^{-4}$ |
| Comparative example 4 | 150 | 7.2 (with distortion | 5.6 | $3 \times 10^{-3}$ |

As in the comparative example 4, when the film thickness δ exceeds 150 nm, the MR element is saturated, resulting in a waveform distortion. As in the comparative example 4, when the film thickness δ is 20 mn, no sufficient reproduction output can be obtained and the coercivity is also poor, resulting in a reduction of resolution. As proved by these experiment results, the film thickness δ should optimally be within a range of 30 to 120 nm.

Next, reproduction outputs, noise levels and error rates when the remanence Mr was varied with the film thickness δ fixed at 120 nm were evaluated. The results are shown in Table 3. In Table 3, the reproduction outputs and noise levels take, as their bases, those of the embodiment 11.

TABLE 3

|  | Remanence (emu/cc) | Reproduction output (dB) | Noise level (dB) | Error rate |
|---|---|---|---|---|
| Comparative example 5 | 150 | −2.4 | −1.8 | $5 \times 10^{-4}$ |
| Embodiment 11 | 200 | 0 | 0 | $1 \times 10^{-4}$ |
| Embodiment 12 | 250 | 2.1 | 2.4 | $7 \times 10^{-5}$ |
| Embodiment 13 | 300 | 3.8 | 3.4 | $5 \times 10^{-5}$ |
| Embodiment 14 | 350 | 4.2 | 3.9 | $7 \times 10^{-5}$ |
| Embodiment 15 | 400 | 6.3 | 4.4 | $8 \times 10^{-4}$ |
| Comparative example 6 | 450 | 6.2 (with distortion) | 5.4 | $3 \times 10^{-3}$ |

As in the comparative example 5, when the remanence Mr is small, no sufficient reproduction output can be obtained in comparison with the embodiments. On the contrarily, when the remanence Mr is too great as in the comparative example 6, the coercivity is lower, noise is higher and the resolution is lower.

Next, the reproduction output, noise level and error rate was evaluated with the intra-plane coercivity of the magnetic recording medium varied. The results are shown in Table 4. In Table 4, the reproduction outputs and noise levels take, as their bases, those of the embodiment 16.

TABLE 4

|  | Coercivity (Oe) | Reproduction output (dB) | Noise level (dB) | Rectangular ratio | Error rate |
|---|---|---|---|---|---|
| Comparative example 7 | 800 | −2.1 | 1.2 | 0.91 | $3 \times 10^{-4}$ |
| Embodiment 16 | 1000 | 0 | 0 | 0.84 | $8 \times 10^{-5}$ |
| Embodiment 17 | 1500 | 1.5 | −0.8 | 0.80 | $7 \times 10^{-5}$ |
| Embodiment 18 | 2000 | 3.3 | −1.3 | 0.76 | $7 \times 10^{-5}$ |
| Embodiment 19 | 2300 | 2.8 | −1.9 | 0.70 | $3 \times 10^{-4}$ |
| Embodiment 20 | 2500 | 2.0 | −2.3 | 0.62 | $7 \times 10^{-4}$ |
| Comparative example 8 | 3000 | −0.5 | −2.6 | 0.58 | $5 \times 10^{-3}$ |

In the comparative example 7, the coercivity is small and the noise level is high as will be seen from Table 4. In the comparative example 8, the coercivity is excessively large and recording is difficult. The reproduction output is found reduced. Therefore, the coercivity should desirably be within the range of 1,000 to 2,500 Oe.

Table 4 shows the intra-plane rectangular ratio measured with the coercivity varied. As seen, the rectangular ratio should desirably be within the range of 0.6 to 0.9 in conjunction with the reproduction output and noise level.

The thin film of magnetic metal should be formed from a Co-based material selected among Co, Co—Ni, Co—Cr and their oxides.

The magnetic tape 47 used in the present invention may have a protective layer for the magnetic layer. The protective layer may be any one which could normally be used as a protective layer for the thin film of magnetic metal. For example, any one may be selected among $CrO_2$, $Al_2O_3$, BN, Co oxide, MgO, $SiO_2$, $Si_3O_4$, SiNx, SiC, $SiN_x$—$SiO_2$, $ZrO_2$, $TiO_2$, TiC, etc. The protective layer may be a single layer, multi-layer or composite layer.

Of course, the magnetic tape 47 is not limited to this construction, but an undercoat may be formed on the non-magnetic support, a backcoat may be formed on the side of the nonmagnetic support opposite to the magnetic metal thin film, or a topcoat of a lubricant, rust-preventive agent or similar may be formed on the surface of the magnetic metal thin film or protective layer.

As seen from the foregoing description, the MR head according to the present invention permits to record without guard band. Therefore, combination with a helical scanning system allows to implement a recording/reproducing system which can attain an incomparably higher recording density and large storage capacity tan the conventional recording/ reproducing systems.

What is claimed is:

1. A magnetoresistive head carried on a rotating drum to read signals on a magnetic tape by the helical scanning method, the magnetoresistive head comprising a magnetoresistive element sandwiched between a pair of soft magnetic material shields to detect signals on the magnetic tape in accordance with magnetoresistance effect principles, the magnetoresistive element having a magnetic sensor disposed obliquely, at a predetermined azimuth angle, to a direction perpendicular in which the magnetic tape is moved relative to the magnetoresistive head;

the magnetoresitive element having an effective width, as measured relative to a width of a recording track width on the tape, that is wider than the width of the recording track on the magnetic tape, and the effective width is 10 micrometers or less and the azimuth angle is 5° to 45°.

2. A recording/reproducing apparatus comprising:

a rotating drum configured to carry at least one head to write and/or read, by the helical scanning method, signals to and/or from, respectively, a magnetic tape with a thin film magnetic metal as a magnetic recording layer, a magnetoresistive head, as a reading head, having a magnetoresistive element sandwiched between a pair of soft magnetic material shields to detect signals on the magnetic tape in accordance with magnetoresistance effect principles, the magnetoresistive element having a magnetic sensor disposed obliquely, at a predetermined azimuth angle, to a direction perpendicular in which the magnetic tape is moved relative to the magnetoresistive head, the magnetoresitive element having an effective width, as measured relative to a width of a recording track width on the tape, that is wider than the width of the recording track on the magnetic tape;

the effective width is 10 micrometers or less and the azimuth angle is 5° to 45°; and an inductive magnetic head as a writing head.

3. A recording/reproducing apparatus comprising:

a rotating drum having installed thereon at least one head to write and/or read, by the helical scanning method, signals to and/or from a magnetic tape with a thin film of magnetic metal as magnetic layer;

a magnetoresistive head, as a reading head, having a magnetoresistive element sandwiched between a pair of soft magnetic material-made shields to detect signals from the magnetic tape in accordance with magnetoresistance effect principles, the magnetoresistive element having a magnetic sensor disposed obliquely, at a predetermined azimuth angle, to a direction perpendicular in which the magnetic tape is moved relative to the magnetoresistive head; and an inductive magnetic head as a writing head;

wherein a product $Mr \cdot \delta$ of remanence $Mr$ and thickness $\delta$ of the thin film of magnetic metal is 1 to 5 memu/cm$^2$.

4. The recording/reproducing apparatus as set forth in claim 3, wherein the remanence $Mr$ of the thin film of magnetic metal is 200 to 400 emu/cc.

5. The recording/reproducing apparatus as set forth in claim 3, wherein the thickness $\delta$ of the thin film of magnetic metal is 30 to 120 nm.

6. The recording/reproducing apparatus as set forth in claim 3, wherein the coercivity in the inplane direction of the magnetic tape is 1,000 to 2,500 Oe.

7. The recording/reproducing apparatus as set forth in claim 3, wherein the rectangular ratio in a direction perpendicular to the magnetic tape is 0.6 to 0.9.

* * * * *